US012587870B2

(12) United States Patent
Patchava et al.

(10) Patent No.: US 12,587,870 B2
(45) Date of Patent: Mar. 24, 2026

(54) BEAM SWEEPING TO IMPROVE THE RANGE OF WIRELESS POWER TRANSFER

(71) Applicant: QUALCOMM Incorporated, San Diego, CA (US)

(72) Inventors: Raviteja Patchava, San Diego, CA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 320 days.

(21) Appl. No.: 18/355,214

(22) Filed: Jul. 19, 2023

(65) Prior Publication Data

US 2025/0031059 A1     Jan. 23, 2025

(51) Int. Cl.
*H04W 16/28*        (2009.01)

(52) U.S. Cl.
CPC .................................. *H04W 16/28* (2013.01)

(58) Field of Classification Search
CPC ....... H04W 16/28; H02J 50/001; H02J 50/80; H02J 50/20
See application file for complete search history.

(56) References Cited

U.S. PATENT DOCUMENTS

| | | | |
|---|---|---|---|
| 2015/0229133 A1 | 8/2015 | Reynolds et al. | |
| 2020/0314752 A1 | 10/2020 | Haque et al. | |
| 2022/0225402 A1* | 7/2022 | Elkotby | .............. H04W 74/004 |
| 2023/0057994 A1* | 2/2023 | Elkotby | ............. H04B 7/06952 |
| 2023/0085960 A1* | 3/2023 | Caglayan | ................ H02J 50/27 |
| | | | 307/104 |
| 2023/0379684 A1* | 11/2023 | Bayesteh | .............. H04W 8/005 |
| 2024/0098454 A1* | 3/2024 | Choukir | ................ H04W 4/029 |
| 2025/0096980 A1* | 3/2025 | Lopez | ................... H04L 5/0007 |

FOREIGN PATENT DOCUMENTS

WO     WO-2020236665 A1    11/2020

OTHER PUBLICATIONS

International Search Report and Written Opinion—PCT/US2024/034353—ISA/EPO—Oct. 8, 2024 (2305116WO).

\* cited by examiner

*Primary Examiner* — Robert C Scheibel
(74) *Attorney, Agent, or Firm* — Holland & Hart LLP

(57)        ABSTRACT

Methods, systems, and devices for wireless communication are described. The techniques described herein relate to beam sweeping to improve the range of wireless power transfer. An energy harvesting user equipment (UE) receives, from a network entity, an indication of a set of time resources associated with a beam sweeping transmission (e.g., polling operation) by the network entity and one or more frequency shifts associated with backscattering the beam sweeping transmission. The UE receives the beam sweeping transmission from the network entity in accordance with the set of time resources. The UE transmits a backscattered signal based on the beam sweeping transmission and the one or more frequency shifts. The UE receives, from the network entity, a beamformed power signal in accordance with transmitting the backscattered signal. The UE stores energy for powering the UE based on the beamformed power signal.

30 Claims, 18 Drawing Sheets

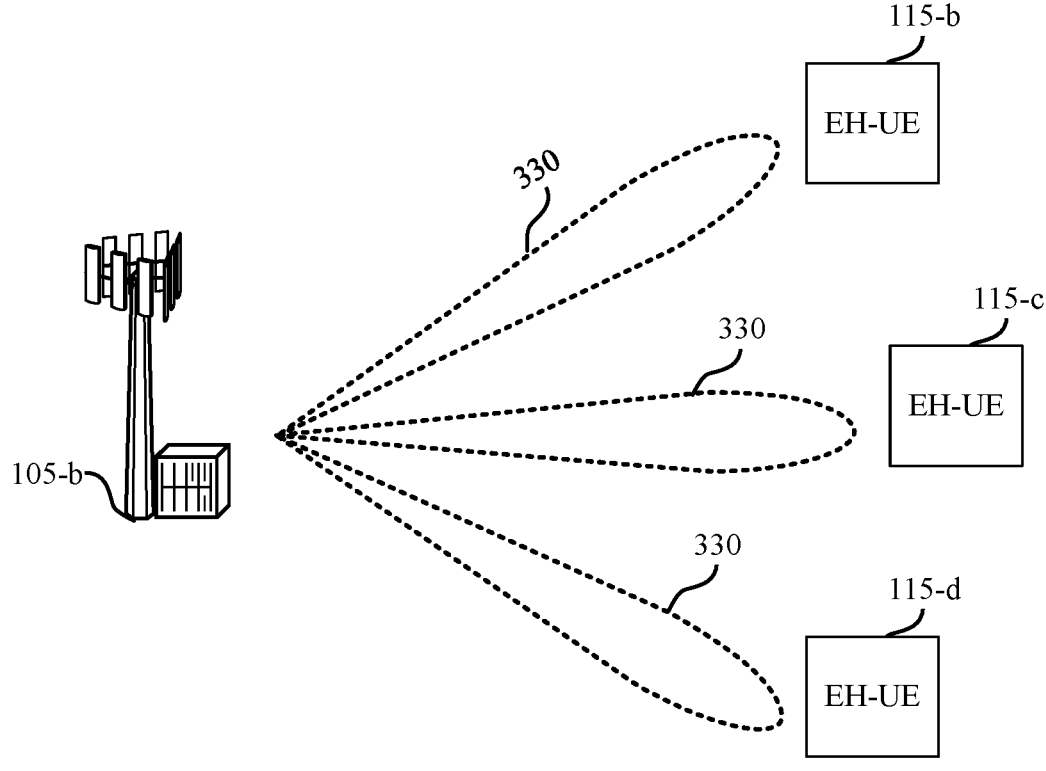
FIG. 3

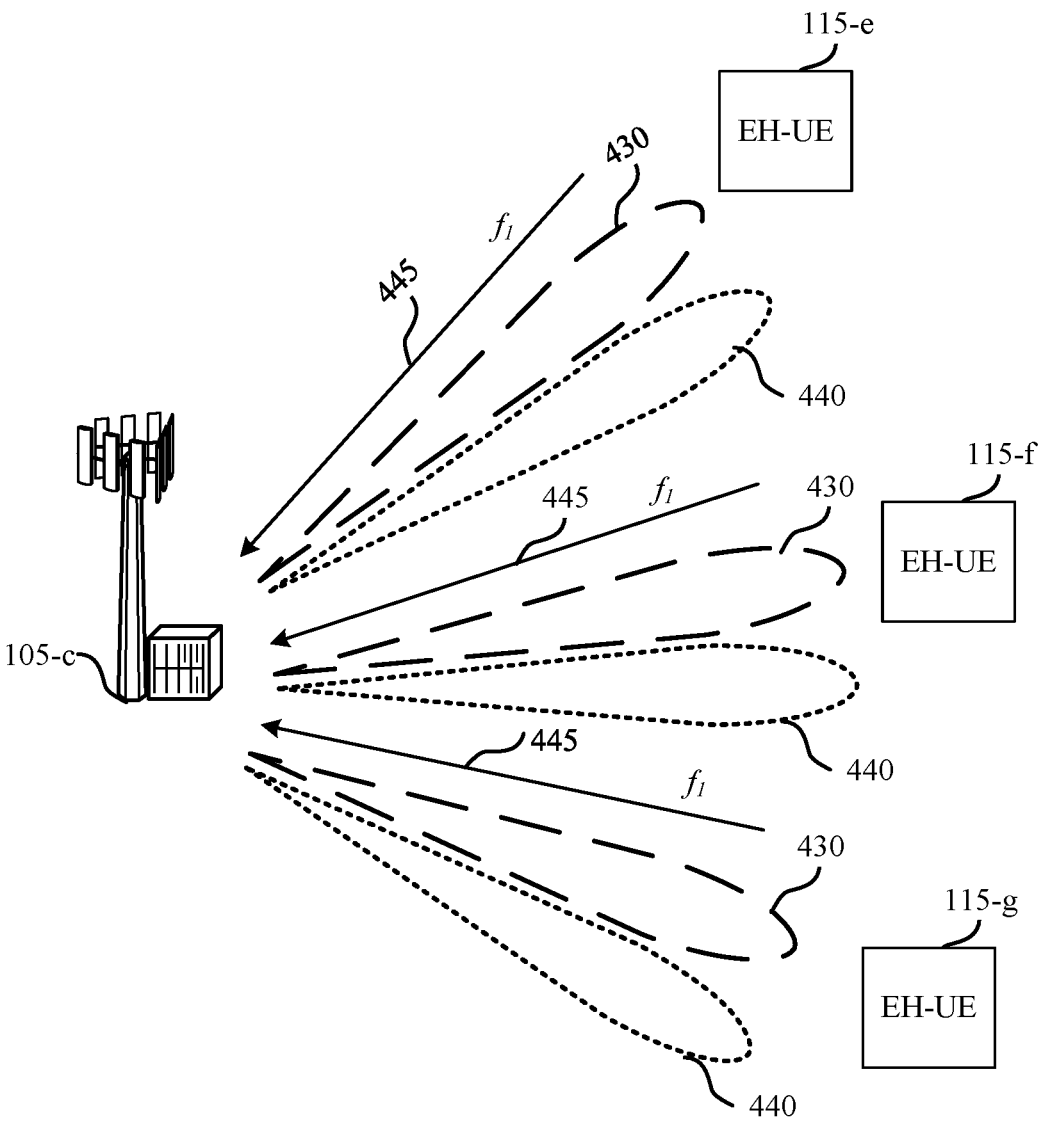
FIG. 4

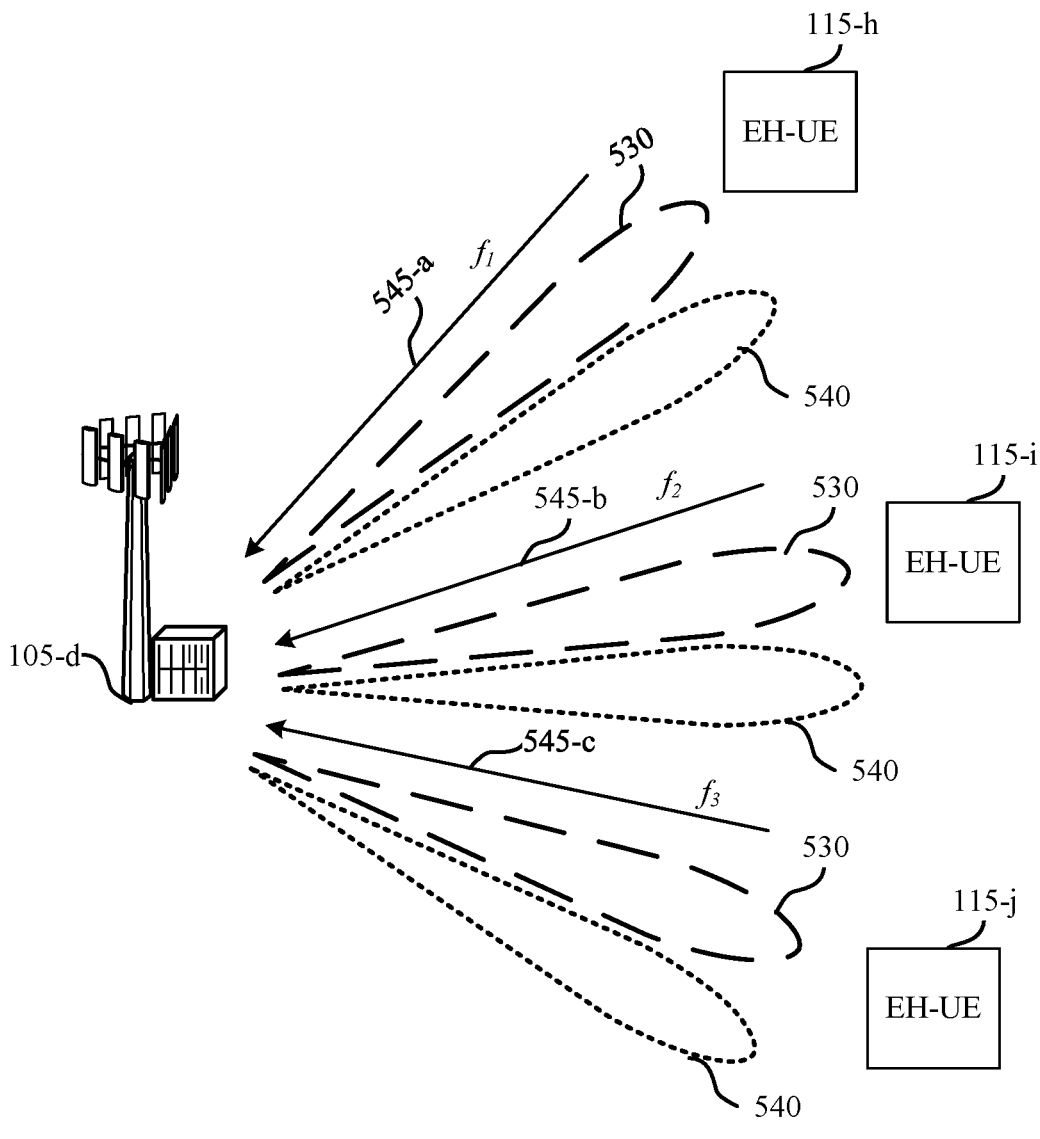
FIG. 5

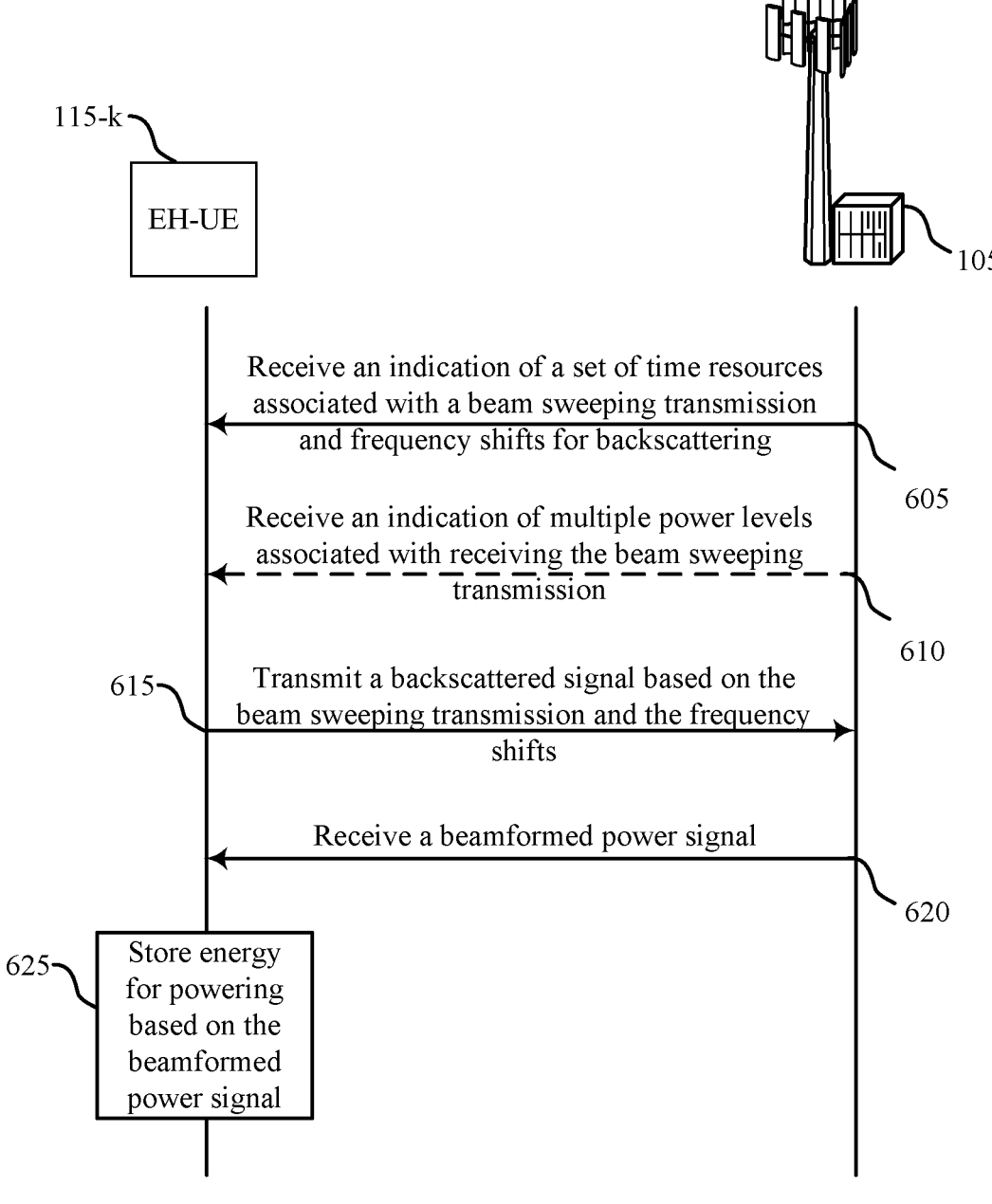

115-k

EH-UE 105-e

Receive an indication of a set of time resources associated with a beam sweeping transmission and frequency shifts for backscattering

605

Receive an indication of multiple power levels associated with receiving the beam sweeping transmission

610

615

Transmit a backscattered signal based on the beam sweeping transmission and the frequency shifts Receive a beamformed power signal

620

625

Store energy for powering based on the beamformed power signal

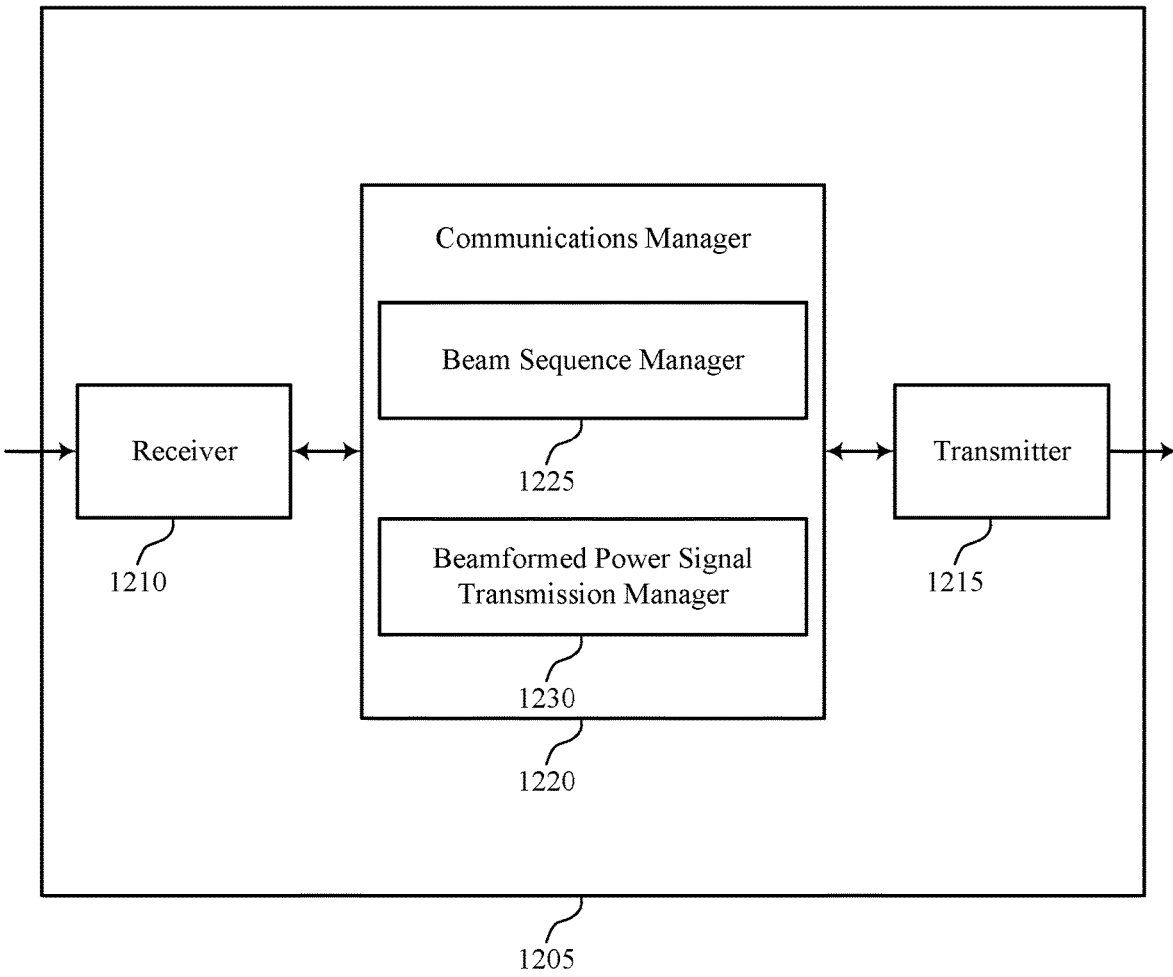
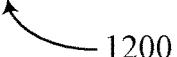
FIG. 12

130

105

115

Network Entity

Transceiver

1410

Antenna

1415

Communications Manager

1420

Memory

Code

1430

1425

Processor

1435

1440

1405

1400

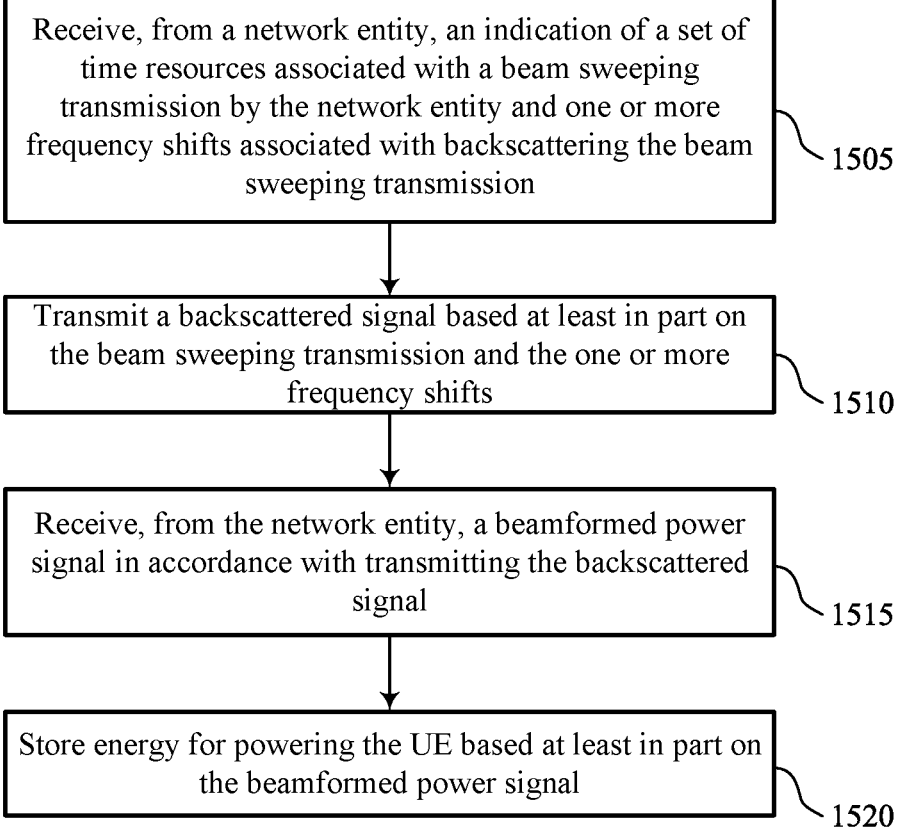

Receive, from a network entity, an indication of a set of time resources associated with a beam sweeping transmission by the network entity and one or more frequency shifts associated with backscattering the beam sweeping transmission

1505

Transmit a backscattered signal based at least in part on the beam sweeping transmission and the one or more frequency shifts

1510

Receive, from the network entity, a beamformed power signal in accordance with transmitting the backscattered signal

1515

Store energy for powering the UE based at least in part on the beamformed power signal

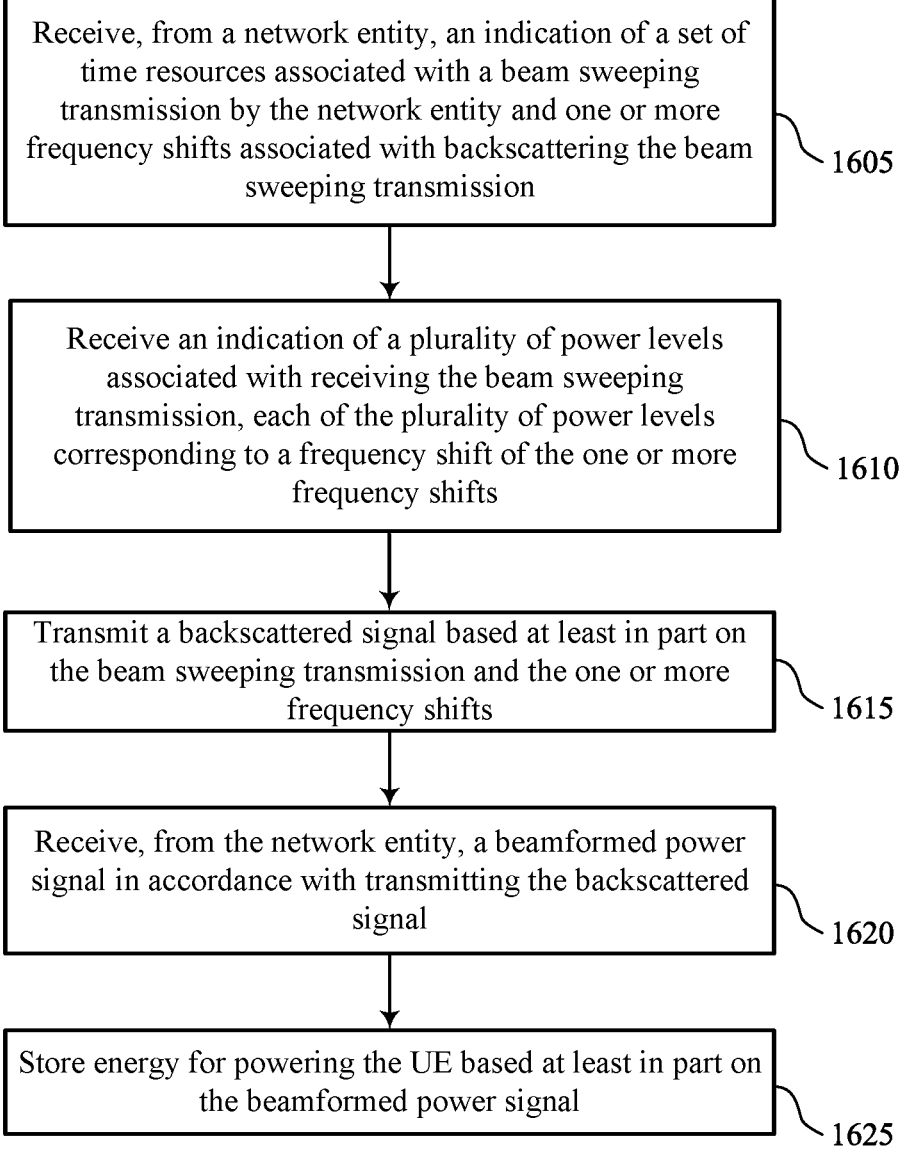

Receive, from a network entity, an indication of a set of time resources associated with a beam sweeping transmission by the network entity and one or more frequency shifts associated with backscattering the beam sweeping transmission ⟍ 1605

Receive an indication of a plurality of power levels associated with receiving the beam sweeping transmission, each of the plurality of power levels corresponding to a frequency shift of the one or more frequency shifts ⟍ 1610

Transmit a backscattered signal based at least in part on the beam sweeping transmission and the one or more frequency shifts ⟍ 1615

Receive, from the network entity, a beamformed power signal in accordance with transmitting the backscattered signal ⟍ 1620

Store energy for powering the UE based at least in part on the beamformed power signal ⟍ 1625

Figure 17:
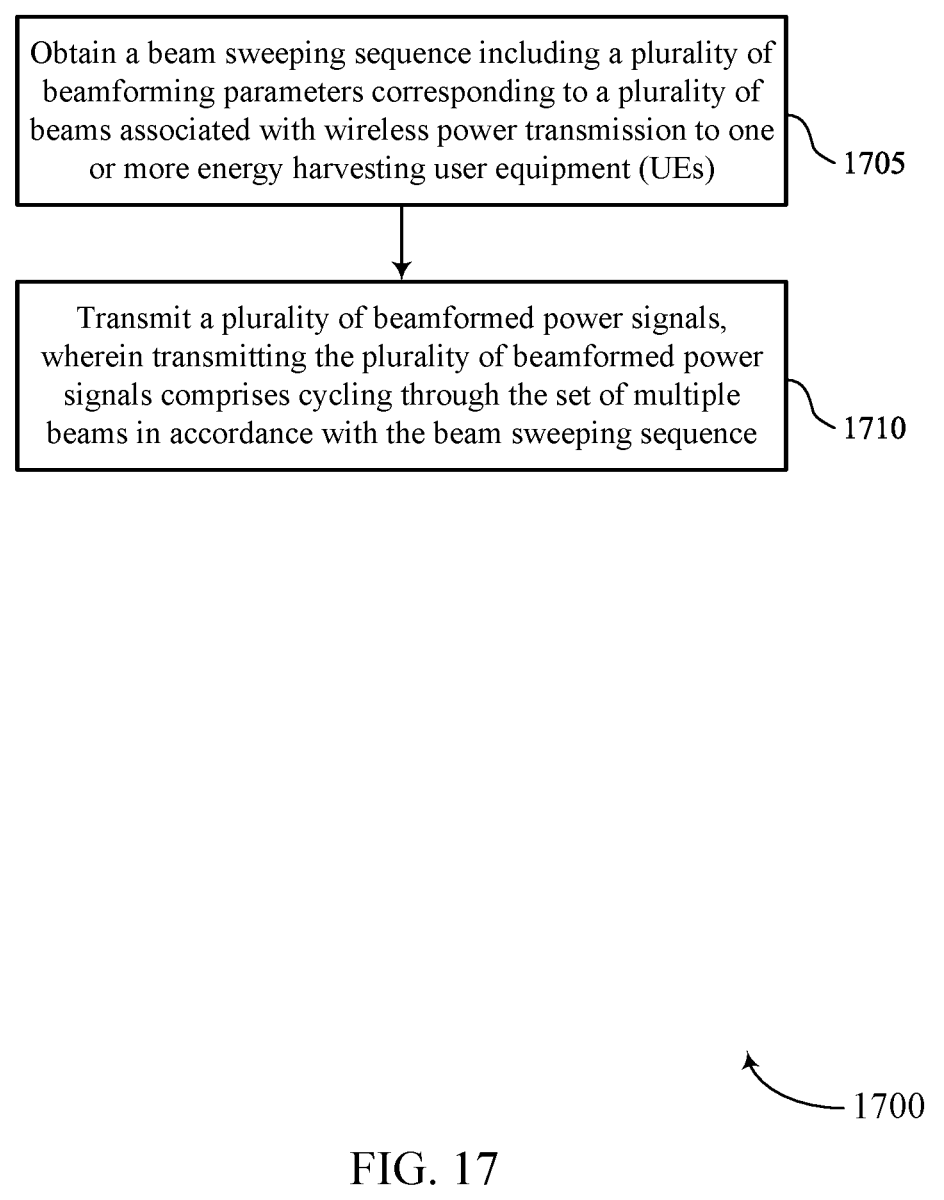

Obtain a beam sweeping sequence including a plurality of beamforming parameters corresponding to a plurality of beams associated with wireless power transmission to one or more energy harvesting user equipment (UEs) — 1705

Transmit a plurality of beamformed power signals, wherein transmitting the plurality of beamformed power signals comprises cycling through the set of multiple beams in accordance with the beam sweeping sequence — 1710

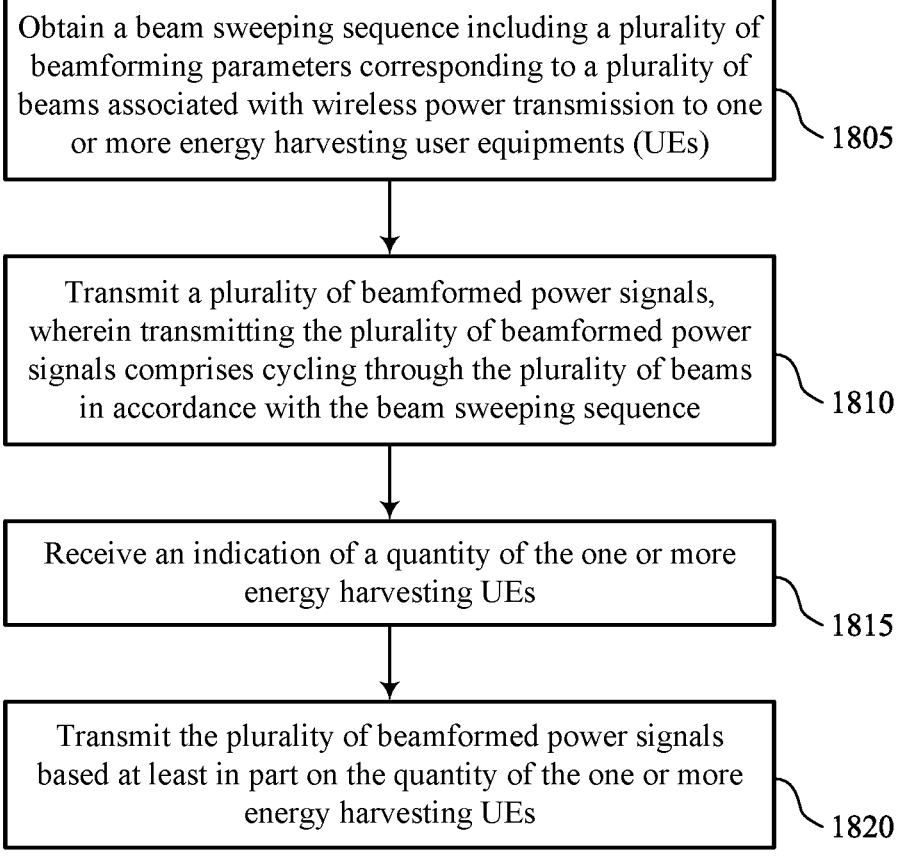

Obtain a beam sweeping sequence including a plurality of beamforming parameters corresponding to a plurality of beams associated with wireless power transmission to one or more energy harvesting user equipments (UEs)

1805

Transmit a plurality of beamformed power signals, wherein transmitting the plurality of beamformed power signals comprises cycling through the plurality of beams in accordance with the beam sweeping sequence

1810

Receive an indication of a quantity of the one or more energy harvesting UEs

1815

Transmit the plurality of beamformed power signals based at least in part on the quantity of the one or more energy harvesting UEs

BEAM SWEEPING TO IMPROVE THE RANGE OF WIRELESS POWER TRANSFER

TECHNICAL FIELD

The following relates to wireless communication, and more specifically to beam sweeping to improve the range of wireless power transfer.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipments (UEs).

Some wireless communication systems may support various wireless devices, such as base stations and user equipments (UEs). For example, wireless communication systems for asset management, logistics, warehousing, manufacturing, and so forth, may involve energy harvesting UEs. Energy harvesting UEs, which may include passive internet of things (IOT) devices, radio frequency identification (RFID) tags, and other passive or partially passive devices, may capture and convert energy from external sources into usable power for powering operations at the energy harvesting UEs.

SUMMARY

The described techniques relate to improved methods, systems, devices, and apparatuses that support selective beam sweeping to improve the range of wireless power transfer. Beam sweeping may involve transmitting beamformed signals to energy harvesting (EH) user equipments (UEs). In some examples, a network entity (e.g., base station) may uniformly transmit beamformed power signals to the EH UEs without knowledge of or feedback from the EH UEs. In some examples, the network entity may receive an indication of the quantity of EH UEs present in each beamforming vector direction to selectively transmit the beamformed power signals. The network entity may transmit an indication of time resources associated with a beam sweeping transmission (e.g., a polling operation) and a frequency shift to the EH UEs to be applied for backscattering, and the network entity may receive the backscattered signals from the EH UEs based on the beam sweeping transmission and the frequency shift. The backscattered signals may be indicative of a quantity of the EH UEs (e.g., network entity has knowledge of the EH UEs). The network entity may transmit the beamformed powered signals in accordance with the quantity of the EH UEs. In some examples, the network entity may also divide the signal power of the beam sweeping polling transmission received at the EH UEs into multiple levels with respective frequency shifts for each of the multiple levels, and the EH UEs may transmit the backscattered signals by the frequency shift accordingly.

A method for wireless communication by a UE is described. The method may include receiving, from a network entity, an indication of a set of time resources associated with a beam sweeping transmission by the network entity and one or more frequency shifts associated with backscattering the beam sweeping transmission, transmitting a backscattered signal based on the beam sweeping transmission and the one or more frequency shifts, receiving, from the network entity, a beamformed power signal in accordance with transmitting the backscattered signal, and storing energy for powering the UE based on the beamformed power signal.

A UE for wireless communication is described. The UE may include at least one processor, at least one memory coupled (e.g., operatively, communicatively, functionally, electronically, or electrically) with the at least one processor, and instructions stored in the at least one memory. The instructions may be executable by the at least one processor (e.g., directly, indirectly, after pre-processing, without pre-processing) to cause the UE to receive, from a network entity, an indication of a set of time resources associated with a beam sweeping transmission by the network entity and one or more frequency shifts associated with backscattering the beam sweeping transmission, transmit a backscattered signal based on the beam sweeping transmission and the one or more frequency shifts, receive, from the network entity, a beamformed power signal in accordance with transmitting the backscattered signal, and store energy for powering the UE based on the beamformed power signal.

Another UE for wireless communication is described. The UE may include means for receiving, from a network entity, an indication of a set of time resources associated with a beam sweeping transmission by the network entity and one or more frequency shifts associated with backscattering the beam sweeping transmission, means for transmitting a backscattered signal based on the beam sweeping transmission and the one or more frequency shifts, means for receiving, from the network entity, a beamformed power signal in accordance with transmitting the backscattered signal, and means for storing energy for powering the UE based on the beamformed power signal.

A non-transitory computer-readable medium storing code for wireless communication is described. The code may include instructions executable by at least one processor (e.g., directly, indirectly, after pre-processing, without pre-processing) to receive, from a network entity, an indication of a set of time resources associated with a beam sweeping transmission by the network entity and one or more frequency shifts associated with backscattering the beam sweeping transmission, transmit a backscattered signal based on the beam sweeping transmission and the one or more frequency shifts, receive, from the network entity, a beamformed power signal in accordance with transmitting the backscattered signal, and store energy for powering the UE based on the beamformed power signal.

Some examples of the method, energies, and non-transitory computer-readable medium described herein may further include operations, features, means, or instructions for measuring a stored energy at the UE, where transmitting the backscattered signal may be based on the stored energy at the UE and a stored energy threshold.

Some examples of the method, energies, and non-transitory computer-readable medium described herein may further include operations, features, means, or instructions for measuring a power level of the beamformed power signal, where transmitting the backscattered signal may be based on a power level of the beamformed power signal and a beamformed power signal threshold.

In some examples of the method, energies, and non-transitory computer-readable medium described herein, receiving the indication of the one or more frequency shifts may include operations, features, means, or instructions for receiving an indication of a set of multiple power levels associated with receiving the beam sweeping transmission, each of the set of multiple power levels corresponding to a frequency shift of the one or more frequency shifts.

Some examples of the method, energies, and non-transitory computer-readable medium described herein may further include operations, features, means, or instructions for transmitting the backscattered signal may be based on a power level of the set of multiple power levels and a corresponding frequency shift of the one or more frequency shifts.

In some examples of the method, energies, and non-transitory computer-readable medium described herein, each of the set of multiple power levels may be indicative of a relative distance from the network entity.

Some examples of the method, energies, and non-transitory computer-readable medium described herein may further include operations, features, means, or instructions for receiving the beamformed power signal may be based on a priority associated with the relative distance from the network entity.

Some examples of the method, energies, and non-transitory computer-readable medium described herein may further include operations, features, means, or instructions for receiving, from the network entity, the beamformed power signal may be based on a priority associated with each of the set of multiple power levels, and a first power level of the set of multiple power levels may be associated with a greater priority than a second power level of the set of multiple power levels, the first power level being less than the second power level.

Some examples of the method, energies, and non-transitory computer-readable medium described herein may further include operations, features, means, or instructions for receiving an indication of a set of multiple power levels associated with the beam sweeping transmission, the beam sweeping transmission including a set of multiple power-based beam sweeping transmissions, each of the set of multiple power-based beam sweeping transmissions corresponding to a power level of the set of multiple power levels and a backscattering sequence of a set of multiple backscattering sequences for transmitting the backscattered signal and transmitting the backscattered signal based on the backscattering sequence of the set of multiple backscattering sequences.

A method for wireless communication by a network entity is described. The method may include obtaining a beam sweeping sequence including a set of multiple beamforming parameters corresponding to a set of multiple beams associated with wireless power transmission to one or more EH UEs and transmitting a set of multiple beamformed power signals, where transmitting the set of multiple beamformed power signals includes cycling through the set of multiple beams in accordance with the beam sweeping sequence.

A network entity for wireless communication is described. The network entity may include at least one processor, at least one memory coupled (e.g., operatively, communicatively, functionally, electronically, or electrically) with the at least one processor, and instructions stored in the at least one memory. The instructions may be executable by the at least one processor (e.g., directly, indirectly, after pre-processing, without pre-processing) to cause the network entity to obtain a beam sweeping sequence including a set of multiple beamforming parameters corresponding to a set of multiple beams associated with wireless power transmission to one or more EH UEs and transmit a set of multiple beamformed power signals, where transmitting the set of multiple beamformed power signals includes cycling through the set of multiple beams in accordance with the beam sweeping sequence.

Another network entity for wireless communication is described. The network entity may include means for obtaining a beam sweeping sequence including a set of multiple beamforming parameters corresponding to a set of multiple beams associated with wireless power transmission to one or more EH UEs and means for transmitting a set of multiple beamformed power signals, where transmitting the set of multiple beamformed power signals includes cycling through the set of multiple beams in accordance with the beam sweeping sequence.

A non-transitory computer-readable medium storing code for wireless communication is described. The code may include instructions executable by at least one processor (e.g., directly, indirectly, after pre-processing, without pre-processing) to obtain a beam sweeping sequence including a set of multiple beamforming parameters corresponding to a set of multiple beams associated with wireless power transmission to one or more EH UEs and transmit a set of multiple beamformed power signals, where transmitting the set of multiple beamformed power signals includes cycling through the set of multiple beams in accordance with the beam sweeping sequence.

In some examples of the method, network entities, and non-transitory computer-readable medium described herein, transmitting the set of multiple beamformed power signals may include operations, features, means, or instructions for receiving an indication of a quantity of the one or more EH UEs and transmitting the set of multiple beamformed power signals based on the quantity of the one or more EH UEs.

In some examples of the method, network entities, and non-transitory computer-readable medium described herein, receiving the indication of the quantity of the one or more EH UEs may include operations, features, means, or instructions for transmitting an indication of a set of time resources associated with a beam sweeping transmission and one or more frequency shifts associated with backscattering the beam sweeping transmission and receiving one or more backscattered signals based on the beam sweeping transmission and the one or more frequency shifts, where the one or more backscattered signals include the indication of the quantity of the one or more EH UEs.

Some examples of the method, network entities, and non-transitory computer-readable medium described herein may further include operations, features, means, or instructions for receiving the one or more backscattered signals may be based on a stored energy at the one or more EH UEs and a stored energy threshold.

In some examples of the method, network entities, and non-transitory computer-readable medium described herein, the beam sweeping sequence may be associated with a set of multiple beam directions of the set of multiple beams over which the one or more backscattered signals may be received.

Some examples of the method, network entities, and non-transitory computer-readable medium described herein may further include operations, features, means, or instructions for transmitting the indication of the set of time resources associated with the beam sweeping transmission includes an indication of a set of multiple power levels associated with transmitting the beam sweeping transmission, each of the set of multiple power levels corresponding to a frequency shift of the one or more frequency shifts.

Some examples of the method, network entities, and non-transitory computer-readable medium described herein may further include operations, features, means, or instructions for transmitting the set of multiple beamformed power signals may be based on a priority associated with each of a set of multiple power levels, each of the set of multiple power levels associated with transmitting the beam sweeping transmission to the one or more EH UEs.

Some examples of the method, network entities, and non-transitory computer-readable medium described herein may further include operations, features, means, or instructions for receiving one or more backscattered signals may be based on respective backscattering sequences associated with each of a set of multiple power levels, each of the set of multiple power levels associated with transmitting the beam sweeping transmission to the one or more EH UEs.

BRIEF DESCRIPTION OF THE DRAWINGS

FIG. 3 shows an example of an energy harvesting procedure that supports beam sweeping to improve the range of wireless power transfer in accordance with one or more aspects of the present disclosure.

FIG. 4 shows an example of an energy harvesting procedure that supports beam sweeping to improve the range of wireless power transfer in accordance with one or more aspects of the present disclosure.

FIG. 5 shows an example of an energy harvesting procedure that supports beam sweeping to improve the range of wireless power transfer in accordance with one or more aspects of the present disclosure.

FIG. 6 shows an example of a process flow that supports beam sweeping to improve the range of wireless power transfer in accordance with one or more aspects of the present disclosure.

FIGS. 11 and 12 show block diagrams of devices that support selective beam sweeping to improve the range of wireless power transfer in accordance with one or more aspects of the present disclosure.

Figure 13:
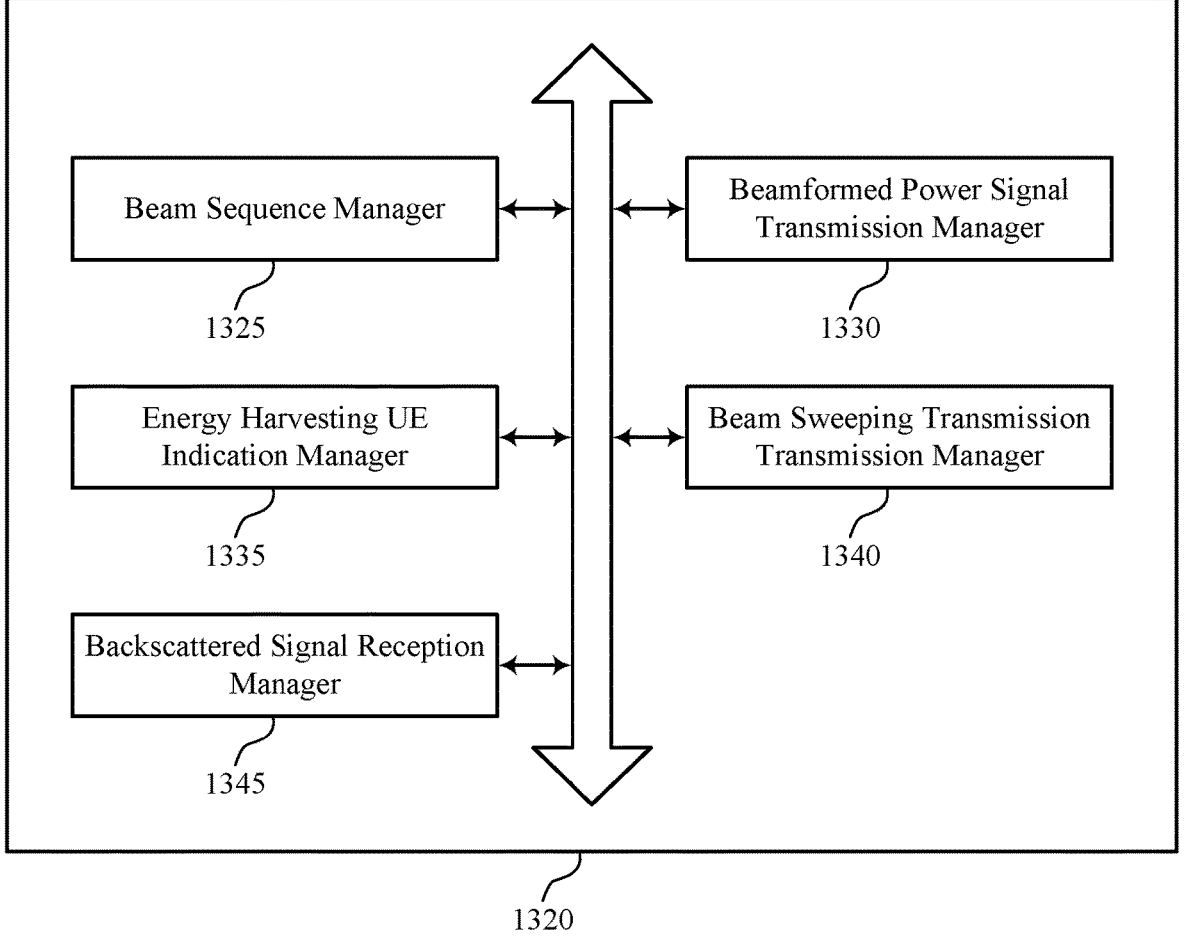

FIG. 13 shows a block diagram of a communications manager that supports beam sweeping to improve the range of wireless power transfer in accordance with one or more aspects of the present disclosure.

Figure 14:

FIG. 14 shows a diagram of a system including a device that supports beam sweeping to improve the range of wireless power transfer in accordance with one or more aspects of the present disclosure.

FIGS. 15 through 18 show flowcharts illustrating methods that support selective beam sweeping to improve the range of wireless power transfer in accordance with one or more aspects of the present disclosure.

DETAILED DESCRIPTION

Some wireless communication systems may support various wireless devices, such as base stations and user equipment (UEs). For example, wireless communication systems for asset management, logistics, warehousing, manufacturing, and so forth, may involve energy harvesting (EH) UEs. The EH UEs, which may include, passive internet of things (IOT) devices, radio frequency identification (RFID) tags, and other passive or partially passive devices, may capture and convert energy from external sources into usable power for powering the EH UEs. The EH UEs may support short distances from the external sources for energy harvesting. However, signal reflections or obstructions in the path between the EH UEs and the external sources may cause signal degradation. Signal degradation to below a threshold may result in energy that cannot be efficiently converted, and thus, the signal energy may not be harvested. Accordingly, the low-powered EH UEs may be unable to communicate as expected with the other devices in the wireless communication systems.

Beamformed signals may provide power for EH UEs. In some examples, a network entity (e.g., base station) may uniformly transmit beamformed power signals to the EH UEs without knowledge of or feedback from the EH UEs. In some examples, the network entity may receive an indication of the quantity of EH UEs present in each beamforming vector direction to selectively transmit the beamformed power signals. The network entity may transmit an indication of time resources associated with a beam sweeping transmission (e.g., a polling operation) and a frequency shift to the EH UEs to be applied for backscattering. The network entity may receive the backscattered signals from the EH UEs based on the beam sweeping transmission and the frequency shift. The backscattered signals may be indicative of a quantity of the EH UEs (e.g., network entity has knowledge of the EH UEs). The network entity may transmit the beamformed powered signals in accordance with the quantity of the EH UEs. In some examples, the network entity may also divide the signal power of the beam sweeping transmission received at the EH UEs into multiple levels with respective frequency shifts for each of the multiple levels, and the EH UEs may transmit the backscattered signals by the frequency shift accordingly.

Aspects of the disclosure are initially described in the context of wireless communications systems. Aspects of the disclosure are further illustrated by and described with reference to apparatus diagrams, system diagrams, and flowcharts that relate to selective beam sweeping to improve the range of wireless power transfer.

Figure 1:
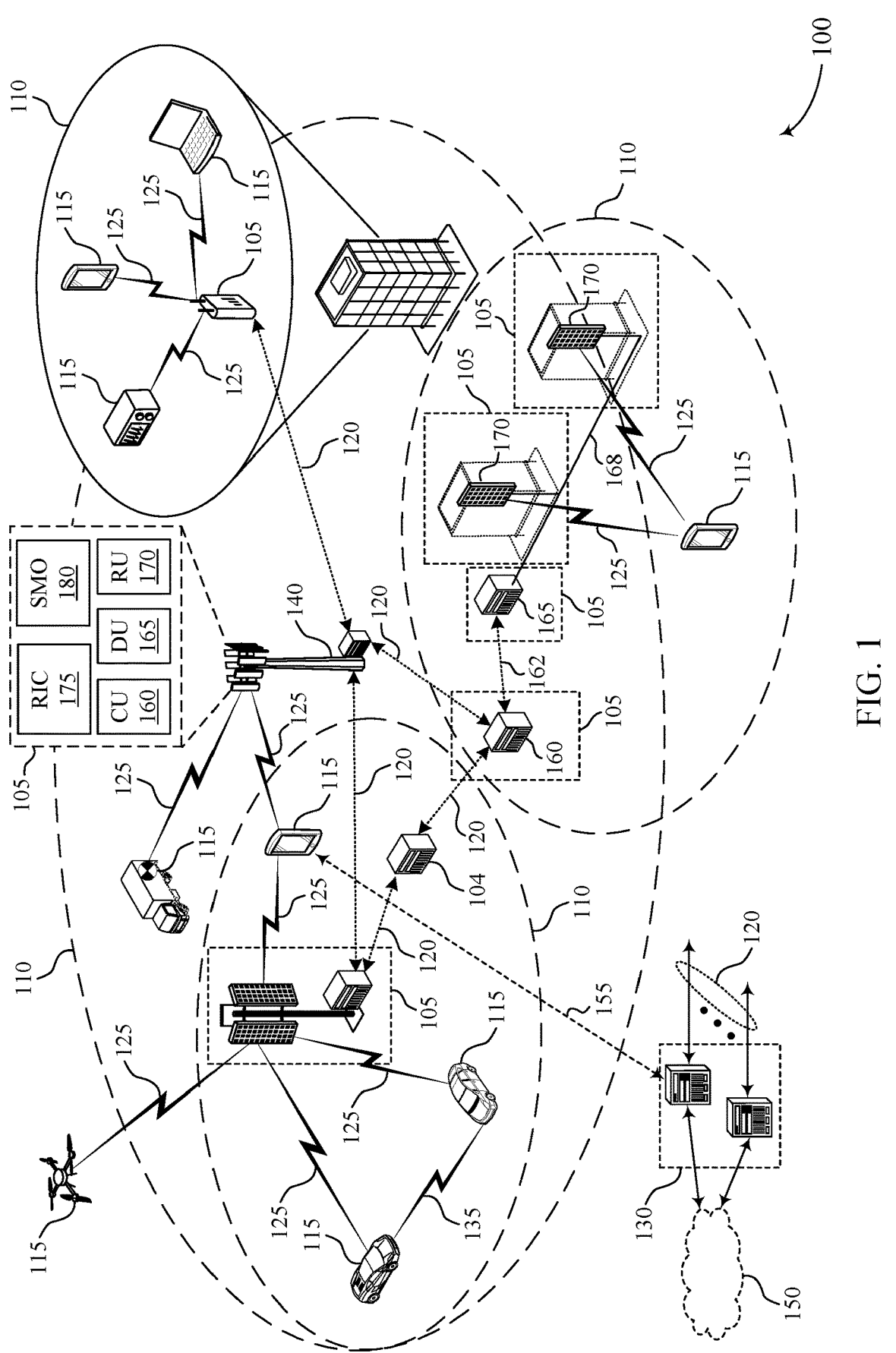
FIG. 1 shows an example of a wireless communications system that supports beam sweeping to improve the range of wireless power transfer in accordance with one or more aspects of the present disclosure.

FIG. 1 shows an example of a wireless communications system 100 that supports beam sweeping to improve the range of wireless power transfer in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein. Components within a wireless communication system may be coupled (for example, operatively, communicatively, functionally, electronically, and/or electrically) to each other.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, or a computing system, may include disclosure of the UE 115, network entity 105, apparatus, device, or computing system, being a node. For example, disclosure that a UE 115 is configured to receive information from a network entity 105 also discloses that a first node is configured to receive information from a second node.

In some examples, network entities 105 may communicate with the core network 130, or with one another, or both.

For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support selective beam sweeping to improve the range of wireless power transfer as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IOT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IOT (also referred to as CAT NB1) UEs, as well as other types of UEs. eMTC and NB-IOT may refer to future technologies that may evolve from or may be based on these technologies. For example, eMTC may include FeMTC (further eMTC), eFeMTC (enhanced further eMTC), and mMTC (massive MTC), and NB-IOT may include cNB-IoT (enhanced NB-IOT), and FeNB-IOT (further enhanced NB-IOT).

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a deviceto-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, wireless communication systems, such as 5G systems, may expand from present day applications, for example, an enhanced Mobile Broadband (eMBB) application, to including Ultra-Reliable and Low Latency Communications (URLLC), massive Machine Type Communications (mMTC), or other communication systems, that may support passive IoT devices (e.g., EH UEs 115). In some examples, wireless standards (e.g., 3rd generation partnership project (3GPP)) may support MTC devices, IoT devices (e.g., narrowband IoT (NB-IOT)), and/or RedCap devices. To efficiently support the passive IoT devices (i.e., RFID-type of sensors), such as for asset management, logistics, warehousing, or manufacturing, the standards may further support and mange passive IoT devices. For example, the network entity 105 may read information stored on passive IoT devices or write information to passive IoT devices, as well as provide energy to the passive IoT devices. An information-bearing signal may be reflected (e.g., backscattered) to the network entity 105, and the network entity 105 may read the reflected signal by passive IoTs to decode the information transmitted by the IoT devices.

The decoded information may be used by the network entity 105 to provide an energy transfer, which may be used by UEs 115 (e.g., passive IoT devices, RFID tags, or other passive or partially passive devices) for radio frequency (RF) power harvesting. The energy transfer and/or the power harvesting may occur at the EH UEs 115 due to input power received at power harvesting (PH) circuitry (e.g., due to diodes) of the EH UEs 115. For example, input power may be greater than −20 decibel milliwatts (dBm) (e.g., with a −10 dBm minimum) to "turn-on" the PH circuitry (due to turn-on voltage of diodes). Energy harvesting may be more efficient at lower frequencies due to diode junction capacitance and resistance of the PH circuitry (e.g., frequency-selective conversion efficiency).

However, the EH UEs 115 may supports short distances (e.g., small range) between an energy source and the UEs 115, such as less than 10 meters (m), to harvest energy. In some examples, a power link (e.g., a reader to tag) may result in a bottleneck link. The PH circuitry of the EH UEs 115 may, in some examples, use an input power of −13 dBm for energy harvesting. Lower input power, such as at −20 dBm or below, may not provide a sufficient cost and conversion efficiency that is above an expected threshold). For example, a low input power (e.g., of −20 dBm or below) may result in a cost and conversion efficiency below 1% (e.g., less than the expected threshold). In some examples, reflections caused by multiple energy source paths, such as by obstructions in the paths, may result in fading energy signals that reduce the acceptable range between the energy source and the EH UEs 115 for energy harvesting. As discussed herein, the range for power transfer may be improved by beamforming a transmit signal from a network entity 105 to a EH UE 115. However, beamforming the transmit signal may involve the network entity 105 to know the state of the channel and acquiring this knowledge may be difficult, especially when a large quantity of EH UEs 115 are present in the wireless communications systems.

In some examples, the UEs 115 may be EH UEs 115 that harvest energy from beamformed power signals. As discussed herein, beamformed power signals may provide power for EH UEs 115, which may include RFID tags, passive IoT devices, or other passive or partially passive devices. In some examples, the network entity 105 may uniformly transmit beamformed power signals to the EH UEs 115 without knowledge of or feedback from the EH UEs 115. In some examples, the network entity 105 may receive an indication of the quantity of EH UEs 115 present in each beamforming vector direction to selectively transmit the beamformed power signals. The network entity 105 may transmit an indication of time resources associated with a beam sweeping transmission (e.g., polling operation requesting data (in the form of backscattered signals) from the EH UEs 115) and a frequency shift to be applied for backscattering. The network entity 105 may receive the backscattered signals from the EH UEs 115 based on the beam sweeping transmission and the frequency shift. The backscattered signals may be indicative of a quantity of the EH UEs 115 (e.g., network entity 105 has knowledge of the EH UEs). The network entity 105 may transmit the beamformed powered signals in accordance with the quantity of the EH UEs 115. In some examples, the network entity 105 may also divide the signal power of the beam sweeping transmission received at the EH UEs 115 into multiple levels with respective frequency shifts for each of the multiple levels, and the EH UEs 115 may transmit the backscattered signals by the frequency shift accordingly. The techniques described herein may provide an efficient transfer of power for energy harvesting at the EH UEs 115, especially for a large quantity of EH UEs 115 in a wireless communications systems (e.g., network entity 105 supporting EH UEs 115 in a coverage area).

Figure 2:
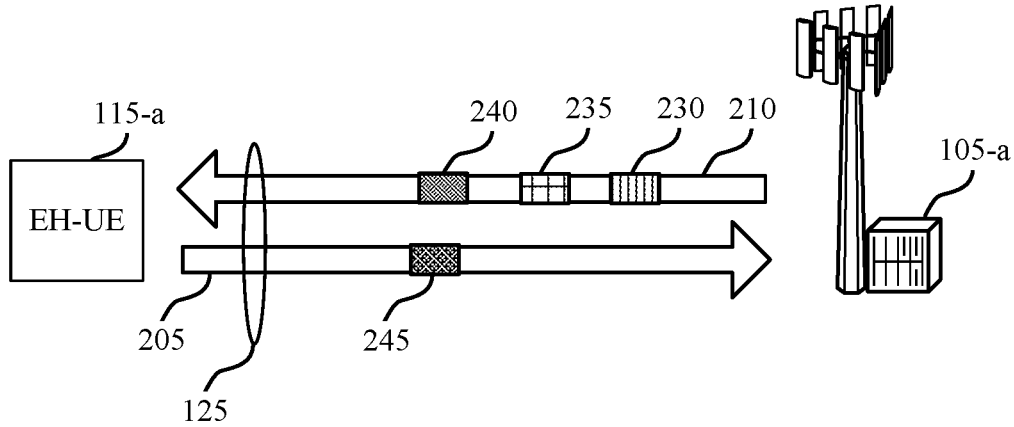
FIG. 2 shows an example of a wireless communications system that supports beam sweeping to improve the range of wireless power transfer in accordance with one or more aspects of the present disclosure.

FIG. 2 shows an example of a wireless communications system 200 that supports beam sweeping to improve the range of wireless power transfer in accordance with one or more aspects of the present disclosure. For example, the wireless communications system 200 includes an EH UE 115-a, which may be an example of a UE 115 described with respect to FIG. 1. The wireless communications system 200 also includes a network entity 105-a, which may be an example of a network entity 105 as described with respect to FIG. 1. Although the wireless communications system 200 depicts one EH UE 115-a, the techniques described herein may apply to one or more EH UEs 115.

The network entity 105-a may communicate with the EH UE 115-a using a communication link 125. In some examples, the communication link 125 may be an example of an NR or LTE link between the EH UE 115-a and the network entity 105-a that may involve beamforming. The communication link 125 may include a bi-directional link that enables both uplink and downlink communications. For example, the EH UE 115-a may transmit uplink signals 205 (e.g., uplink transmissions), such as uplink control signals or uplink data signals, to the network entity 105-a using the communication link 125 and the network entity 105-a may transmit downlink signals 210 (e.g., downlink transmissions), such as downlink control signals or downlink data signals, to the EH UE 115-a using the communication link 125. In some examples, the network entity 105-a may transmit a beam sweeping transmission (e.g., a polling operation) downlink via the communication link 125 to the EH UE 115-a and other EH UEs 115 (not shown) to determine if EH UEs 115 are disposed in a particular beam direction and/or a quantity of the EH UEs 115 in the particular beam direction based on backscattered signals from the EH UEs 115 to the network entity 105-a. The network entity 105-a may also transmit beamformed power signals downlink via the communication link 125 to the EH UEs 115, providing power for the EH UEs 115 to harvest so that the EH UEs 115 have sufficient power (e.g., over a power threshold) to operate as expected within the wireless communications systems 200.

In particular, the network entity 105-a may transmit signaling indicating a beam sweeping transmission 230 to the EH UE 115-a (e.g., one or more EH UEs 115). The beam sweeping transmission 230 may be or involve a polling operation, where the network entity 105-a requests the receiving EH UE 115-a to indicate a status or presence to the network entity 105. In some examples, indicating the presence involve a backscattered signal from the EH UE 115-a. Accordingly, the beam sweeping transmission 230 may include a set of time resources associated with the beam sweeping transmission 230, the beam sweeping transmission, one or more frequency shifts associated with backscattering the beam sweeping transmission 230, or any combination thereof. For example, the network entity 105-a may transmit the beam sweeping transmission to the EH UE 115-a in accordance with the set of time resources (e.g., during the indicated time frame). In some examples, the network entity 105-a may also transmit signaling indicating multiple power levels 235 that are associated with receiving the beam sweeping transmission 230 at the EH UE 115-a. The multiple power levels 235 may additionally or alternatively be provided with signaling indicating the beam sweeping transmission 230.

Each of the multiple power levels may correspond to one of multiple frequency shifts so that when respective backscattered signals from multiple EH UEs 115 are received at the network entity 105-a, the network entity 105-a may distinguish between the backscattered signals. Distinguishing between the backscattered signals may enable the network entity 105-a to accurately determine a quantity of the EH UEs 115 in a beam direction, as well as determine a distance at which the EH UEs 115 are disposed with respect to the network entity 105-a.

In some examples, each of the power levels may be associated with or indicative of a distance from the network entity 105 to the EH UE 115-a. For example, a high power level (e.g., above a power threshold) may correspond to the beam sweeping transmission being received at the EH UE 115-a with a high power (e.g., less signal degradation), indicating that the receiving EH UE 115-a is relatively near the network entity 105-a. A low power level may correspond to the beam sweeping transmission being received at the EH UE 115-a with a low power, indicating that the EH UE 115-a is relatively far the network entity 105-a. In some examples, the network entity 105-a may use this information (e.g., that the EH UE 115-a received the beam sweeping transmission with a low power level indicative of the EH UE 115-a being disposed at a distance greater than a threshold range with respect to the network entity 105-a), in order to prioritize transmitting a beamformed power signal to the EH UE 115-a.

Moreover, multiple EH UEs 115 may be disposed in the same beam direction where some of the EH UEs 115 are disposed relatively close with respect to the network entity 105-a while some of the EH UEs 115 are disposed relatively far with respect to the network entity 105-a. The EH UEs 115 may transmit based on frequency shifts associated with different power levels, such that the EH UEs 115 that are disposed close to the network entity 105-a transmit the backscattered signal with a first frequency shift while the EH UEs 115 that are disposed far from the network entity 105 transmit the backscattered signal with a second frequency shift. As such, the network entity 105-a receiving the backscattered signals with different frequency shifts from EH UEs 115 in the same beam direction may prevent or reduce a near-fear effect. The near-far effect may otherwise result in the network entity 105-a being unable to distinguish that multiple EH UEs 115 are disposed in the beam direction at different distances with respect to the network entity 105-a, potentially impacting prioritization of transmitting the beamformed power signals.

The network entity 105-a may transmit the beamformed power signal 240. For example, the network entity 105-a may uniformly transmit the beamformed power signal 240 to all EH UEs 115 (so that the large quantity of EH UEs 115 in the wireless communications system 200 receive the power signaling for potential power harvesting). In some examples, the network entity 105-a may selectively transmit the beamformed power signal 240 to the EH UEs 115 based on a quantity of EH UEs 115 preset in a beam direction. The quantity of EH UEs 115 preset in a beam direction may be based on a backscattered signal of the beam sweeping transmission 230, as discussed herein.

The EH UE 115-a may transmit a backscattered signal 245 to the network entity 105-a. Receiving the backscattered signal 245 may indicate to the network entity 105-a that a EH UE 115 is present in the particular beam direction in which the beam sweeping transmission was transmitted. In some examples, the backscattered signal 245 may indicate the relative distance of the EH UE 115 based on the frequency shift associated with the backscattered signal, where the frequency shift is associated with a power level of receiving the beam sweeping transmission 230.

FIG. 3 shows an example of an energy harvesting procedure 300 that supports beam sweeping to improve the range of wireless power transfer in accordance with one or more aspects of the present disclosure. The energy harvesting procedure 300 involves a network entity 105-b that transmits beamformed power signals towards one or more EH UEs 115 in one or more beam directions. Beamforming facilitates concentrating a majority of RF energy in a particular direction via each of the beams, and the beam directions may correspond to the multiple EH UEs 115. Although the energy harvesting procedure 300, as well as the energy harvesting procedures 400 and 500 discussed with respect to FIG. 4 and FIG. 5, describe three EH UEs 115 (e.g., EH UH 115-a, EH UE 115-b, and EH UH 115-c of FIG. 3), the techniques described herein may include fewer or more EH UEs 115.

During the energy harvesting procedure 300, the network entity 105-b may uniformly transmit beamformed power signals 330 to the EH UEs 115, including the EH UH 115-a, EH UE 115-b, and EH UH 115-c. In particular, the energy harvesting procedure 300 may implement a uniform sweep of all beamforming vectors (e.g., beamformed power signals in the multiple directions) to facilitate a wireless power transfer. The uniform beam sweeping may correspond or correlate to synchronization signal block (SSB) transmissions, and the power transfer may occur at particular time repetitions. The network entity 105-b may sweep the beams in a time domain, a frequency domain, a spatial domain, or any combination thereof. The uniform sweeping of the beamformed power signals may be performed without any channel knowledge of the EH UEs 115, such as knowledge of a quantity of the EH UEs 115 in each beam direction. In some examples, EH UEs 115 may not be present in one or more beamforming direction (e.g., not a single EH UE 115 in a particular beam direction and/or outside of a threshold range from the network entity 105-b). In such examples, the uniform sweeping of the beamformed power signals 330 may be inefficient since some of the beamformed power signals may not be received by any EH UEs 115. Some channel knowledge related to the EH UEs 115 may be helpful to improve the efficiency.

FIG. 4 shows an example of an energy harvesting procedure 400 that supports beam sweeping to improve the range of wireless power transfer in accordance with one or more aspects of the present disclosure. The energy harvesting procedure 400 involves a network entity 105-*c* that selectively transmits beamformed power signals (e.g., beam sweeping) towards one or more EH UEs 115, such as EH UE 115-*e*, EH UE 115-*f*, EH UE 115-*g*, in one or more beam directions.

During the energy harvesting procedure 400, the network entity 105-*c* may estimate the quantity of EH UEs 115 present in each beamforming vector direction. The network entity 105-*c* may use this knowledge to selectively sweep the beamforming vectors (or transmit the beamformed power signals). For example, if UEs 115 are not present in a beamforming vector direction, then the network entity 105-*c* may not transmit that beamforming vector in the sweep. The network entity 105-*c* may conserve energy and time by not transmitting beamformed power signals in directions that do not have EH UEs 115. In some examples, if a small quantity of UEs 115 are present in a beamforming vector direction, then 105-*c* may transmit the respective beamforming vector (e.g., beamformed power signal) in a relatively small quantity of resources in comparison to other beamforming vectors in the beamforming sweep that have a larger quantity of UEs 115 in the associated beamforming vector directions.

To estimate the quantity of UEs 115 present in a beamforming direction, the network entity 105-*c* may transmit beam sweeping transmission 430, as described with respect to beam sweeping transmission 230 of FIG. 2. For example, the beam sweeping transmission 430 may be or involve a polling operation, where the network entity 105-*c* requests the receiving EH UE 115-*e*, EH UE 115-*f*, or EH UE 115-*g*, to indicate a status or presence to the network entity 105. In some examples, indicating the presence involve a backscattered signal from the EH UE 115-*a*. The beam sweeping transmission 430 may include a set of time resources associated with the beam sweeping transmission 430 and a frequency shift associated with backscattering the beam sweeping transmission 430. That is, the network entity 105-*c* may inform the present EH UEs 115 of a time duration during which the beam sweeping occurs for measurement by the EH UEs 115 and a frequency shift to be applied when backscattering the beam sweeping transmission signal. The frequency shift may be uniform or the same frequency, $f_1$, for the backscattered signals from the various EH UEs 115.

The network entity 105-*c* may transmit the beam sweeping transmission 430, which includes transmitting each of the beams (e.g., RF signals) towards the EH UEs 115 in each of the beam directions. The EH UEs 115 may receive the beams from the network entity 105-*c* during the indicated time duration and the EH UEs 115 may measure the power for the beams in the respective beam direction. The EH UEs 115 may transmit backscattered signals 445 by applying the frequency shift.

In some examples, the EH UEs 115 may selectively backscatter the beam sweeping transmission 230 based on channel-related or UE-related conditions. For example, if the battery level of a EH UE 115 is high (e.g., above a power threshold), the EH UE 115 may selectively not backscatter, and instead, remains silent during the measurement since the EH UE 115 is not in a low-power mode and does not need to harvest additional energy. In some examples, if the EH UE 115 is disposed close to (e.g., within a threshold distance from the network entity 105-*c*) the EH UE 115 may harvest energy from all the pre-decoding vectors, and thus, may remain silent during the measuring and backscattering duration. The network entity 105-*c* may determine that a EH UE 115 is not present in the particular beam direction based on the lack of backscatter, and the network entity 105-*c* may exclude the beam direction when transmitting beamformed power signals. In this manner, knowledge of the EH UEs 115 indicated by backscattered signals or lack thereof, may facilitate efficient beam sweeping of the beamformed power signals to the EH UEs 115.

The network entity 105-*c* may receive the backscattered signals 445 from the UEs 115 over all the beam directions. The network entity 105-*c* may measure the received signal power for each backscattered signal 445 (e.g., beams) from the UEs 115, and select the pattern of beamforming vectors or beamformed power signals 440 to be transmitted for a power transfer. For example, the network entity 105-*c* may estimate the quantity of EH UEs 115 present in a beam direction based on the total received power of that beam, indicated via receiving the backscattered signal 445. The network entity 105-*c* may transmit the selected pattern of beamforming vectors for the power transfer accordingly.

FIG. 5 shows an example of an energy harvesting procedure 500 that supports beam sweeping to improve the range of wireless power transfer in accordance with one or more aspects of the present disclosure. The energy harvesting procedure 500 involves a network entity 105-*d* that selectively transmits beamformed power signals (e.g., beam sweeping) towards one or more EH UEs 115, such as EH UE 115-*h*, EH UE 115-*i*, and EH UE 115-*j*, in one or more beam directions based on power level received at the EH UEs 115.

During the energy harvesting procedure 500, the network entity 105-*d* and EH UEs 115 may function as described with respect to FIG. 4. However, the backscattered signals from the EH UEs 115 may also indicate a power level at which the beam sweeping transmission was received at the EH UEs 115, and the network entity 105-*d* may use this knowledge to selectively transmit the beamformed signals. Backscattered signals that indicate power levels may prevent or reduce a near-far effect otherwise associated with EH UEs 115 that are disposed far (e.g., above a distance threshold) from the network entity 105-*d* and/or in the same beam direction as EH UEs 115 closer to the network entity 105-*d*. For example, multiple EH UEs 115 may be disposed in the same beam direction where some of the EH UEs 115 are disposed relatively close with respect to the network entity 105-*a* while some of the EH UEs 115 are disposed relatively far with respect to the network entity 105-*a*. A near-far effect may result in the network entity 105-*a* being unable to distinguish between multiple EH UEs 115 that are disposed in the beam direction at different distances with respect to the network entity 105-*a*, potentially impacting prioritization of transmitting the beamformed power signals or transmitting the beamformed power signals at a power level that may not enable the relatively far EH UEs 115 to harvest energy from the beamformed power signals.

The network entity 105-*d* may divide the signal power received at the EH UEs 115 into different levels associated with respective thresholds (e.g., each of the levels associated with a range of power). The network entity 105-*d* may also allocate different frequency shifts for each level for backscattering.

In some examples, the EH UEs 115 may support a distinct frequency shift and inform the network entity 105-*d* accordingly, during the beam sweeping transmission (e.g., an initial access procedure). The network entity 105-*d* may transmit the beam sweeping transmission 530 to the EH UEs 115, such as EH UE 115-*h*, EH UE 115-*i*, and EH UE 115-*j*. The beam sweeping transmission 530, other signaling, or both, may inform the EH UEs 115 of the different frequency shifts to be applied for backscattering, where the different frequency shifts are based on different power levels at which the beam sweeping transmission 530 is received at the UEs 115.

The UEs 115 may apply a frequency shift and transmit backscattered signals 545 to the network entity 105-*d*, where the frequency shift is based on the power at which the beam sweeping transmission 530 was received at the EH UEs 115. For example, the EH UE 115-*h* may apply a first frequency shift, $f_1$, for transmitting a first backscattered signal 545-*a* to the network entity 105-*d*, the EH UE 115-*i* may apply a second frequency shift, $f_2$, for transmitting a second backscattered signal 545-*b* to the network entity 105-*d*, the EH UE 115-*j* may apply a third frequency shift, $f_3$, for transmitting a third backscattered signal 545-*c* to the network entity 105-*d*, where the first frequency shift, the second frequency shift, and the third frequency shift are all different frequency shifts based on different powers at which the beam sweeping transmissions 530 were received at the EH UEs 115. The EH UEs 115 that receive the beam sweeping transmission 530 at the same or similar power level (e.g., within the same power threshold or range) may use the same frequency shift to prevent the near-far effect at the network entity 105-*d*.

The network entity 105-*d* may receive the backscattered signals 545 over the multiple frequency shifts for all the beams and measure the quantity of EH UEs 115 in each beam. In some examples, the network entity 105-*d* may repeat transmitting the beam sweeping transmission 530 for better channel measurement (e.g., more than a single instance of beam sweeping transmission). In some examples, the EH UEs 115 may use different sequences to backscatter the backscattered signals 545 for the different received power levels. In such examples, EH UEs 115 that receive the beam sweeping transmission 530 at the same or similar power levels (e.g., within the power level threshold) may use the same sequence for backscattering. The network entity 105-*d* may measure the channel (e.g., determine quantity of EH UEs 115 in each beam direction) based on the sequence patterns.

Based on the channel measurements, the network entity 105-*d* may schedule transmitting the beamformed power signals 540. In some examples, the network entity 105-*d* may prioritize beams based on the indicated power level (e.g., as indicated by the frequency shift or backscattering sequence). For example, the network entity 105-*d* may prioritize transmitting the beamformed power signals 540 in a beam direction in which the EH UEs 115 have the lowest power level of receiving the beam sweeping transmission 530. In this manner, the network entity 105-*d* may transmit the beamformed power signals 540 to EH UEs 115 that are disposed relatively farther than the other EH UEs 115 (as indicated by the lower received power). Prioritizing transmitting the beamformed power signals 540 for energy transferring may especially improve power transfers for the EH UEs 115 that are relatively from the network entity 105-*d* since the far away EH UEs 115 may not be able to harvest energy from other beamformed power signal in other beam directions, whereas EH UEs 115 that are disposed relatively closer to the network entity 105-*d* may be able to harvest energy from the other beamformed power signals 540 and avoid being in a low power mode.

FIG. 6 shows an example of a process flow 600 that supports beam sweeping to improve the range of wireless power transfer in accordance with one or more aspects of the present disclosure. The process flow 600 may implement aspects of or may be implemented by aspects of the wireless communications system 100 or the wireless communications system 200. For example, the process flow 600 may include a EH UE 115-*k*, which may be an example of a UE 115 as described herein. The process flow 600 may include a network entity 105-*e*, which may be an example of a network entity 105 as described herein. In the following description of the process flow 600, the operations performed by the network entity 105-*e* and the EH UE 115-*k* may be performed in different orders or at different times than the exemplary order shown. Some operations may also be omitted from the process flow 600, or other operations may be added to the process flow 600. Further, while operations in the process flow 600 are illustrated as being performed by the network entity 105-*e* and the EH UE 115-*k*, the examples herein are not to be construed as limiting, as the described features may be associated with any quantity of different devices.

At 605, the EH UE 115-*k* may receive an indication of a set of time resources associated with a beam sweeping transmission the network entity 105-*e* and one or more frequency shifts associated with backscattering the beam sweeping transmission. In some examples, the EH UE 115-*k* may receive the beam sweeping transmission in accordance with the set of time resources (e.g., during an indicated time frame). In some examples, at 610, the EH UE 115-*k* may also receive an indication of multiple of multiple power levels associated with receiving the beam sweeping transmission. Each of the multiple power levels may correspond to a frequency shift of the one or more frequency shifts. In some examples, each of the multiple power levels is indicative of a relative distance from the network entity 105-*e*. Moreover, in some examples, the beam sweeping transmission may include multiple power-based beam sweeping transmissions. Each of the multiple power-based beam sweeping transmissions may correspond to a power level of the multiple power levels and a backscattering sequence of multiple backscattering sequences for transmitting the backscattered signal. That is, each of the backscattering sequences may correspond to a respective power level for receiving the beam sweeping transmission.

At 615, the EH UE 115-*k* may transmit a backscattered signal based on the beam sweeping transmission and one or more frequency shifts. In some examples, the EH UE 115-*k* may transmit the backscattered signal based on a power level of the multiple power levels and the corresponding frequency shift for the power level. In some examples, the EH UE 115-*k* may measure a power level of the beam sweeping transmission and transmit the backscattered signal based on a power level of the beam sweeping transmission and a threshold. In some examples, transmitting the backscattered signal is based on the backscattering sequence of the multiple backscattering sequences. In some examples, the EH UE 115-*k* may measure a stored energy at the EH UE 115-*k*, and transmitting the backscattered signal may be based on the stored energy and a stored energy threshold.

At 620, the EH UE 115-*k* may receive a beamformed power signal in accordance with transmitting the backscattered signal. In some examples, receiving the beamformed power signal may be based on a priority associated with the relative distance from the network entity 105-*e*. In some examples, receiving the beamformed power signal may be based on a priority associated with each of the multiple power levels. A first power level of the multiple power levels may be associated with a greater priority than a second power level of the multiple power levels, where the first power level is less than the second power level. In some examples, the network entity 105-*e* may uniformly transmit beamformed power signals in every beam direction, where the network entity 105-*e* transmits the beamformed power signal without knowledge of an estimated quantity of UEs 115 (e.g., no beam sweeping transmission indicating set of time resources and frequency shifts).

At 625, the EH UE 115-*k* may store energy for powering the EH UE 115-*k* based on the beamformed power signal. That is, the EH UE 115-*k* may harvest RF energy from the RF beamformed power signal.

Figure 7:
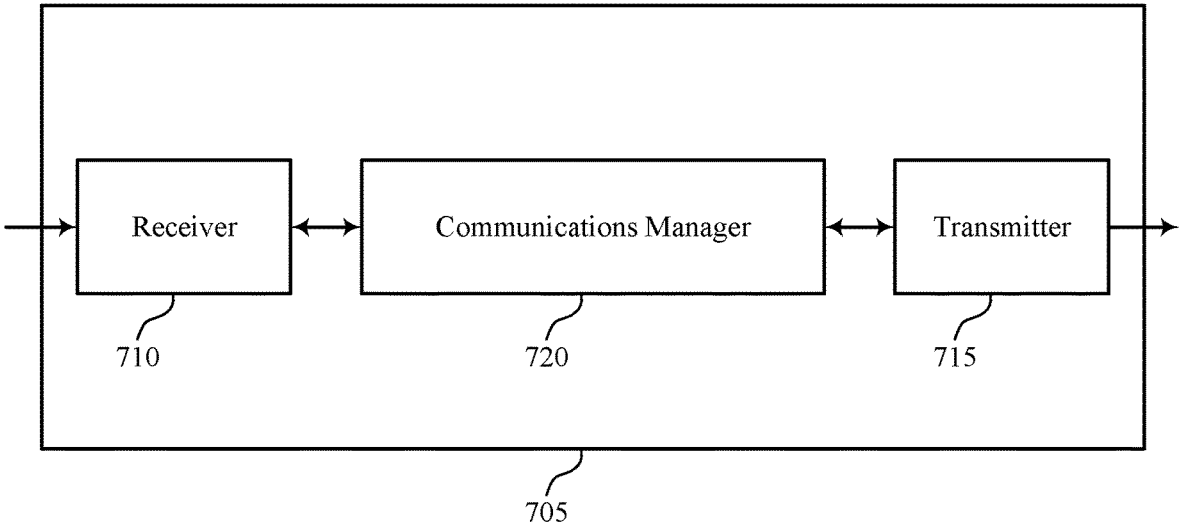
FIGS. 7 and 8 show block diagrams of devices that support selective beam sweeping to improve the range of wireless power transfer in accordance with one or more aspects of the present disclosure.

FIG. 7 shows a block diagram 700 of a device 705 that supports beam sweeping to improve the range of wireless power transfer in accordance with one or more aspects of the present disclosure. The device 705 may be an example of aspects of a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory (e.g., operatively, communicatively, functionally, electronically, or electrically), to, individually or collectively, support or enable the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to selective beam sweeping to improve the range of wireless power transfer). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to selective beam sweeping to improve the range of wireless power transfer). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of selective beam sweeping to improve the range of wireless power transfer as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a digital signal processor (DSP), a central processing unit (CPU), a graphics processing unit (GPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled (e.g., operatively, communicatively, functionally, electronically, or electrically) with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software) executed by at least one processor. If implemented in code executed by at least one processor, the functions of the communications manager 720, the receiver 710, the transmitter 715, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication in accordance with examples as disclosed herein. For example, the communications manager 720 is capable of, configured to, or operable to support a means for receiving, from a network entity, an indication of a set of time resources associated with a beam sweeping transmission by the network entity and one or more frequency shifts associated with backscattering the beam sweeping transmission. The communications manager 720 is capable of, configured to, or operable to support a means for transmitting a backscattered signal based on the beam sweeping transmission and the one or more frequency shifts. The communications manager 720 is capable of, configured to, or operable to support a means for receiving, from the network entity, a beamformed power signal in accordance with transmitting the backscattered signal. The communications manager 720 is capable of, configured to, or operable to support a means for storing energy for powering the EH UE based on the beamformed power signal.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for efficient energy transfers using beam sweeping and selective transmission of beamformed power signals based on an estimated quantity of UEs in each beam direction, thereby facilitating efficient utilization of beamforming resources and time resources.

Figure 8:
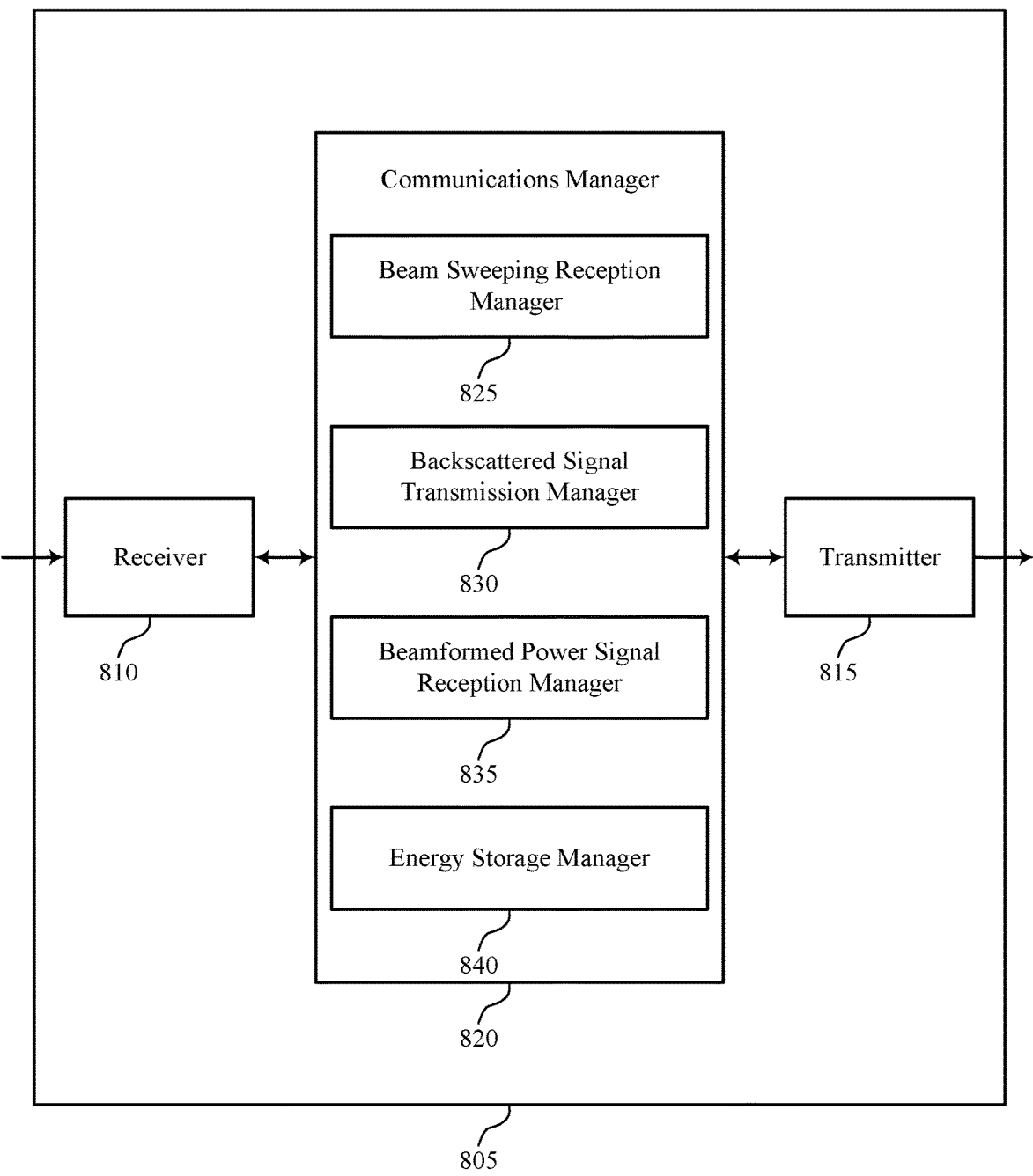

FIG. 8 shows a block diagram 800 of a device 805 that supports beam sweeping to improve the range of wireless power transfer in accordance with one or more aspects of the present disclosure. The device 805 may be an example of aspects of a device 705 or a UE 115 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled (e.g., operatively, communicatively, functionally, electronically, or electrically) with at least one memory, to support the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to selective beam sweeping to improve the range of wireless power transfer). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to selective beam sweeping to improve the range of wireless power transfer). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of selective beam sweeping to improve the range of wireless power transfer as described herein. For example, the communications manager 820 may include a beam sweeping reception manager 825, a backscattered signal transmission manager 830, a beamformed power signal reception manager 835, an energy storage manager 840, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication in accordance with examples as disclosed herein. The beam sweeping reception manager 825 is capable of, configured to, or operable to support a means for receiving, from a network entity, an indication of a set of time resources associated with a beam sweeping transmission by the network entity and one or more frequency shifts associated with backscattering the beam sweeping transmission. The backscattered signal transmission manager 830 is capable of, configured to, or operable to support a means for transmitting a backscattered signal based on the beam sweeping transmission and the one or more frequency shifts. The beamformed power signal reception manager 835 is capable of, configured to, or operable to support a means for receiving, from the network entity, a beamformed power signal in accordance with transmitting the backscattered signal. The energy storage manager 840 is capable of, configured to, or operable to support a means for storing energy for powering the EH UE based on the beamformed power signal.

Figure 9:
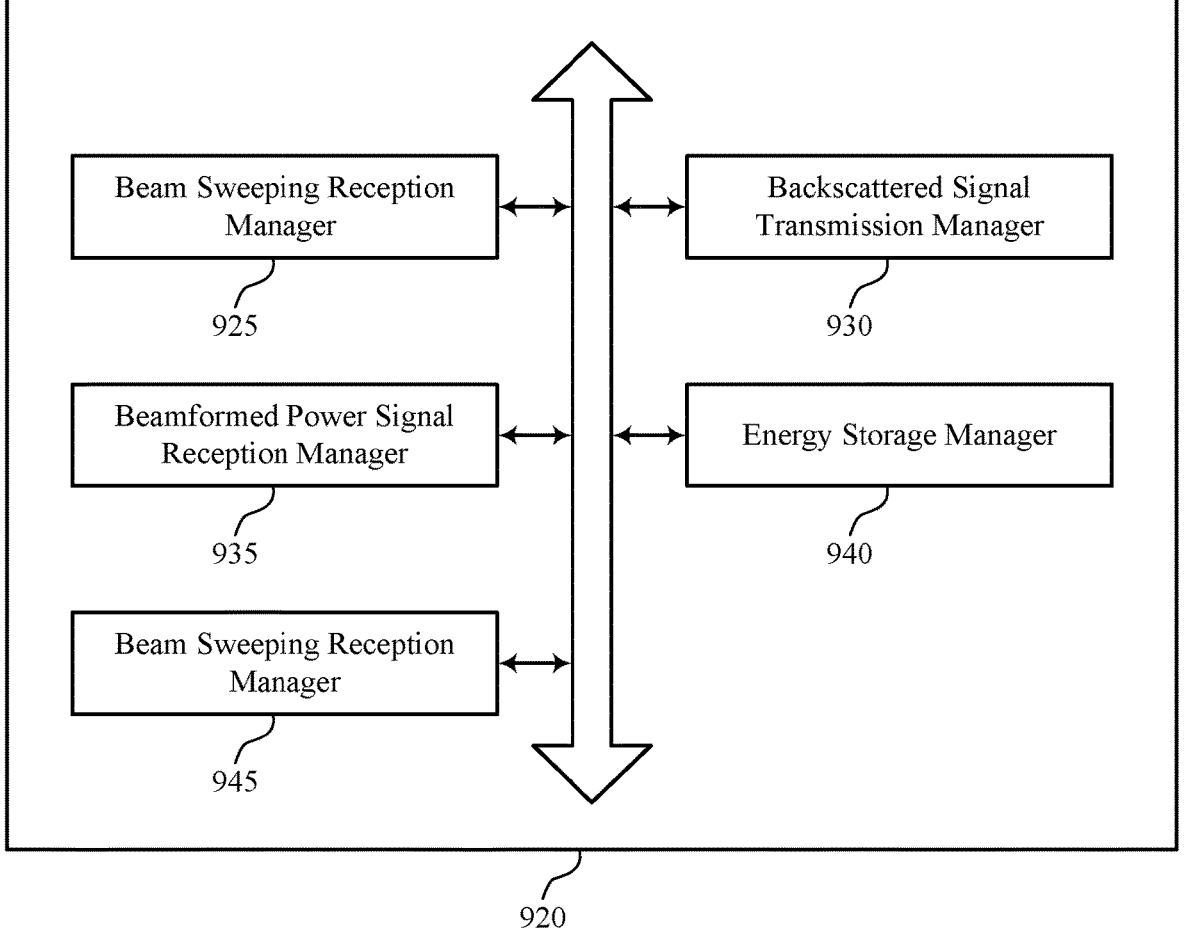
FIG. 9 shows a block diagram of a communications manager that supports beam sweeping to improve the range of wireless power transfer in accordance with one or more aspects of the present disclosure.

FIG. 9 shows a block diagram 900 of a communications manager 920 that supports beam sweeping to improve the range of wireless power transfer in accordance with one or more aspects of the present disclosure. The communications manager 920 may be an example of aspects of a communications manager 720, a communications manager 820, or both, as described herein. The communications manager 920, or various components thereof, may be an example of means for performing various aspects of selective beam sweeping to improve the range of wireless power transfer as described herein. For example, the communications manager 920 may include a beam sweeping reception manager 925, a backscattered signal transmission manager 930, a beamformed power signal reception manager 935, an energy storage manager 940, a beam sweeping reception manager 945, or any combination thereof. Each of these components, or components or subcomponents thereof (e.g., one or more processors, one or more memories), may communicate, directly or indirectly, with one another (e.g., via one or more buses).

The communications manager 920 may support wireless communication in accordance with examples as disclosed herein. The beam sweeping reception manager 925 is capable of, configured to, or operable to support a means for receiving, from a network entity, an indication of a set of time resources associated with a beam sweeping transmission by the network entity and one or more frequency shifts associated with backscattering the beam sweeping transmission. The backscattered signal transmission manager 930 is capable of, configured to, or operable to support a means for transmitting a backscattered signal based on the beam sweeping transmission and the one or more frequency shifts. The beamformed power signal reception manager 935 is capable of, configured to, or operable to support a means for receiving, from the network entity, a beamformed power signal in accordance with transmitting the backscattered signal. The energy storage manager 940 is capable of, configured to, or operable to support a means for storing energy for powering the EH UE based on the beamformed power signal.

In some examples, the energy storage manager 940 is capable of, configured to, or operable to support a means for measuring a stored energy at the EH UE, where transmitting the backscattered signal is based on the stored energy at the EH UE and a stored energy threshold.

In some examples, the beamformed power signal reception manager 935 is capable of, configured to, or operable to support a means for measuring a power level of the beamformed power signal, where transmitting the backscattered signal is based on a power level of the beamformed power signal and a beamformed power signal threshold.

In some examples, to support receiving the indication of the one or more frequency shifts, the beam sweeping reception manager 945 is capable of, configured to, or operable to support a means for receiving an indication of a set of multiple power levels associated with receiving the beam sweeping transmission, each of the set of multiple power levels corresponding to a frequency shift of the one or more frequency shifts.

In some examples, transmitting the backscattered signal is based on a power level of the set of multiple power levels and a corresponding frequency shift of the one or more frequency shifts.

In some examples, each of the set of multiple power levels is indicative of a relative distance from the network entity.

In some examples, receiving the beamformed power signal is based on a priority associated with the relative distance from the network entity.

In some examples, receiving, from the network entity. In some examples, the beamformed power signal is based on a priority associated with each of the set of multiple power levels. In some examples, a first power level of the set of multiple power levels is associated with a greater priority than a second power level of the set of multiple power levels, the first power level being less than the second power level.

In some examples, the beam sweeping reception manager 945 is capable of, configured to, or operable to support a means for receiving an indication of a set of multiple power levels associated with the beam sweeping transmission, the beam sweeping transmission including a set of multiple power-based beam sweeping transmissions, each of the set of multiple power-based beam sweeping transmissions corresponding to a power level of the set of multiple power levels and a backscattering sequence of a set of multiple backscattering sequences for transmitting the backscattered signal. In some examples, the backscattered signal transmission manager 930 is capable of, configured to, or operable to support a means for transmitting the backscattered signal based on the backscattering sequence of the set of multiple backscattering sequences.

Figure 10:
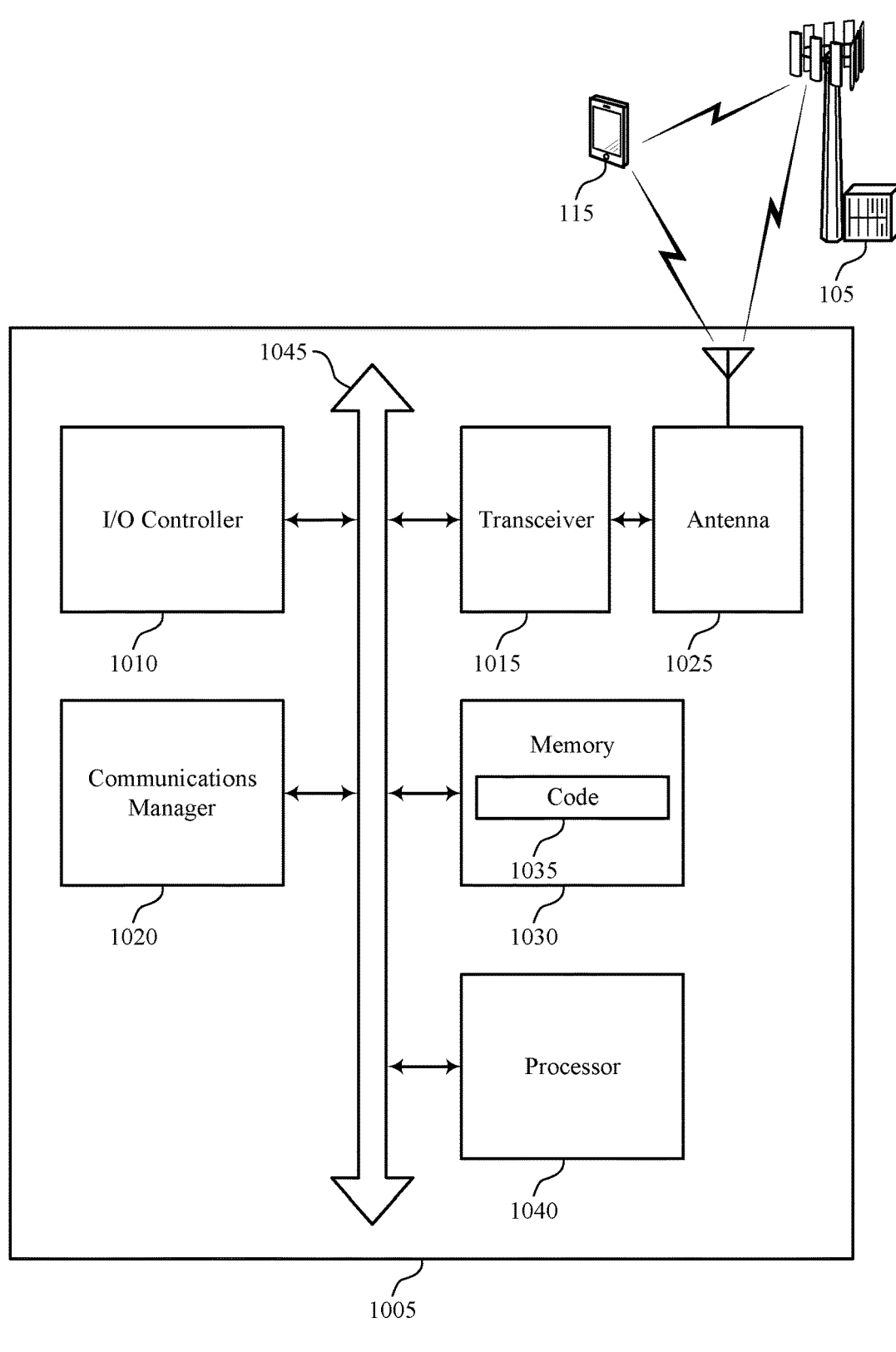
FIG. 10 shows a diagram of a system including a device that supports beam sweeping to improve the range of wireless power transfer in accordance with one or more aspects of the present disclosure.

FIG. 10 shows a diagram of a system 1000 including a device 1005 that supports beam sweeping to improve the range of wireless power transfer in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, at least one memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of one or more processors, such as the at least one processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The at least one memory 1030 may include random access memory (RAM) and read-only memory (ROM). The at least one memory 1030 may store computer-readable, computer-executable code 1035 including instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the at least one memory 1030 may contain, among other things, a basic I/O system (BIOS) which may control basic hardware or software operation such as the interaction with peripheral components or devices.

The at least one processor 1040 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in a memory (e.g., the at least one memory 1030) to cause the device 1005 to perform various functions (e.g., functions or tasks supporting selective beam sweeping to improve the range of wireless power transfer). For example, the device 1005 or a component of the device 1005 may include at least one processor 1040 and at least one memory 1030 coupled with or to the at least one processor 1040, the at least one processor 1040 and at least one memory 1030 configured to perform various functions described herein. In some examples, the at least one processor 1040 may include multiple processors and the at least one memory 1030 may include multiple memories. One or more of the multiple processors may be coupled (e.g., operatively, communicatively, functionally, electronically, or electrically) with one or more of the multiple memories, which may, individually or collectively, be configured to perform various functions herein.

The communications manager 1020 may support wireless communication in accordance with examples as disclosed herein. For example, the communications manager 1020 is capable of, configured to, or operable to support a means for receiving, from a network entity, an indication of a set of time resources associated with a beam sweeping transmission by the network entity and one or more frequency shifts associated with backscattering the beam sweeping transmission. The communications manager 1020 is capable of, configured to, or operable to support a means for transmitting a backscattered signal based on the beam sweeping transmission and the one or more frequency shifts. The communications manager 1020 is capable of, configured to, or operable to support a means for receiving, from the network entity, a beamformed power signal in accordance with transmitting the backscattered signal. The communications manager 1020 is capable of, configured to, or operable to support a means for storing energy for powering the EH UE based on the beamformed power signal.

By including or configuring the communications manager 1020 in accordance with examples as described herein, the device 1005 may support techniques for efficient energy transfers using beam sweeping and selective transmission of beamformed power signals based on an estimated quantity of UEs in each beam direction, thereby facilitating efficient utilization of beamforming resources and time resources.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the at least one processor 1040, the at least one memory 1030, the code 1035, or any combination thereof. For example, the code 1035 may include instructions executable by the at least one processor 1040 (e.g., directly, indirectly, after pre-processing, without pre-processing) to cause the device 1005 to perform various aspects of selective beam sweeping to improve the range of wireless power transfer as described herein, or the at least one processor 1040 and the at least one memory 1030 may be otherwise configured to, individually or collectively, perform or support such operations.

Figure 11:
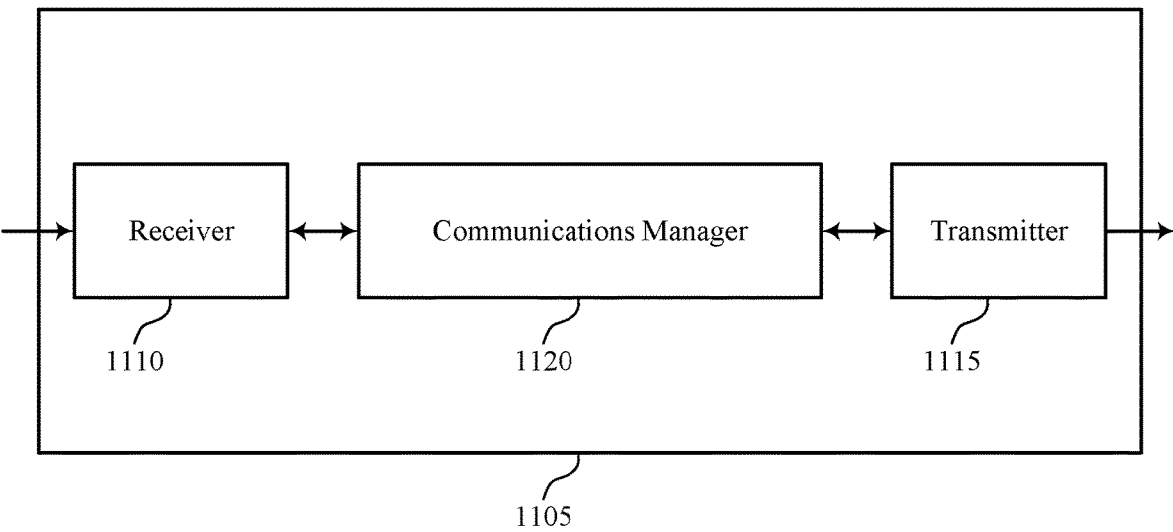

FIG. 11 shows a block diagram 1100 of a device 1105 that supports beam sweeping to improve the range of wireless power transfer in accordance with one or more aspects of the present disclosure. The device 1105 may be an example of aspects of a network entity 105 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to, individually or collectively, support or enable the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of selective beam sweeping to improve the range of wireless power transfer as described herein. For example, the communications manager 1120, the receiver 1110, the transmitter 1115, or various combinations or components thereof may be capable of performing one or more of the functions described herein.

In some examples, the communications manager 1120, the receiver 1110, the transmitter 1115, or various combinations or components thereof may be implemented in hardware (e.g., in communications management circuitry). The hardware may include at least one of a processor, a DSP, a CPU, a GPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1120, the receiver 1110, the transmitter 1115, or various combinations or components thereof may be implemented in code (e.g., as communications management software) executed by at least one processor. If implemented in code executed by at least one processor, the functions of the communications manager 1120, the receiver 1110, the transmitter 1115, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication in accordance with examples as disclosed herein. For example, the communications manager 1120 is capable of, configured to, or operable to support a means for obtaining a beam sweeping sequence including a set of multiple beamforming parameters corresponding to a set of multiple beams associated with wireless power transmission to one or more EH UEs 115. The communications manager 1120 is capable of, configured to, or operable to support a means for transmitting a set of multiple beamformed power signals, where transmitting the set of multiple beamformed power signals includes cycling through the set of multiple beams in accordance with the beam sweeping sequence.

By including or configuring the communications manager 1120 in accordance with examples as described herein, the device 1105 (e.g., at least one processor controlling or otherwise coupled with the receiver 1110, the transmitter 1115, the communications manager 1120, or a combination thereof) may support techniques for efficient energy transfers using beam sweeping and selective transmission of beamformed power signals based on an estimated quantity of UEs in each beam direction, thereby facilitating efficient utilization of beamforming resources and time resources.

FIG. 12 shows a block diagram 1200 of a device 1205 that supports beam sweeping to improve the range of wireless power transfer in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205, or one or more components of the device 1205 (e.g., the receiver 1210, the transmitter 1215, and the communications manager 1220), may include at least one processor, which may be coupled with at least one memory, to support the described techniques. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of selective beam sweeping to improve the range of wireless power transfer as described herein. For example, the communications manager 1220 may include a beam sequence manager 1225 a beamformed power signal transmission manager 1230, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication in accordance with examples as disclosed herein. The beam sequence manager 1225 is capable of, configured to, or operable to support a means for obtaining a beam sweeping sequence including a set of multiple beamforming parameters corresponding to a set of multiple beams associated with wireless power transmission to one or more EH UEs 115. The beamformed power signal transmission manager 1230 is capable of, configured to, or operable to support a means for transmitting a set of multiple beamformed power signals, where transmitting the set of multiple beamformed power signals includes cycling through the set of multiple beams in accordance with the beam sweeping sequence.

FIG. 13 shows a block diagram 1300 of a communications manager 1320 that supports beam sweeping to improve the range of wireless power transfer in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of selective beam sweeping to improve the range of wireless power transfer as described herein. For example, the communications manager 1320 may include a beam sequence manager 1325, a beamformed power signal transmission manager 1330, an energy harvesting UE indication manager 1335, a beam sweeping transmission manager 1340, a backscattered signal reception manager 1345, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communication in accordance with examples as disclosed herein. The beam sequence manager 1325 is capable of, configured to, or operable to support a means for obtaining a beam sweeping sequence including a set of multiple beamforming parameters corresponding to a set of multiple beams associated with wireless power transmission to one or more EH UEs 115. The beamformed power signal transmission manager 1330 is capable of, configured to, or operable to support a means for transmitting a set of multiple beamformed power signals, where transmitting the set of multiple beamformed power signals includes cycling through the set of multiple beams in accordance with the beam sweeping sequence.

In some examples, to support transmitting the set of multiple beamformed power signals, the energy harvesting UE indication manager 1335 is capable of, configured to, or operable to support a means for receiving an indication of a quantity of the one or more EH UEs. In some examples, to support transmitting the set of multiple beamformed power signals, the beamformed power signal transmission manager 1330 is capable of, configured to, or operable to support a means for transmitting the set of multiple beamformed power signals based on the quantity of the one or more EH UEs.

In some examples, to support receiving the indication of the quantity of the one or more EH UEs, the beam sweeping transmission manager 1340 is capable of, configured to, or operable to support a means for transmitting an indication of a set of time resources associated with a beam sweeping transmission and one or more frequency shifts associated with backscattering the beam sweeping transmission. In some examples, to support receiving the indication of the quantity of the one or more EH UEs, the backscattered signal reception manager 1345 is capable of, configured to, or operable to support a means for receiving one or more backscattered signals based on the beam sweeping transmission and the one or more frequency shifts, where the one or more backscattered signals include the indication of the quantity of the one or more EH UEs.

In some examples, receiving the one or more backscattered signals is based on a stored energy at the one or more EH UEs and a stored energy threshold.

In some examples, the beam sweeping sequence is associated with a set of multiple beam directions of the set of multiple beams over which the one or more backscattered signals are received.

In some examples, transmitting the indication of the set of time resources associated with the beam sweeping transmission includes an indication of a set of multiple power levels associated with transmitting the beam sweeping transmission, each of the set of multiple power levels corresponding to a frequency shift of the one or more frequency shifts.

In some examples, transmitting the set of multiple beamformed power signals is based on a priority associated with each of a set of multiple power levels, each of the set of multiple power levels associated with transmitting the beam sweeping transmission to the one or more EH UEs.

In some examples, receiving one or more backscattered signals is based on respective backscattering sequences associated with each of a set of multiple power levels, each of the set of multiple power levels associated with transmitting the beam sweeping transmission to the one or more EH UEs.

FIG. 14 shows a diagram of a system 1400 including a device 1405 that supports beam sweeping to improve the range of wireless power transfer in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, at least one memory 1425, code 1430, and at least one processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or one or more memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or one or more memory components (e.g., the at least one processor 1435, the at least one memory 1425, or both), may be included in a chip or chip assembly that is installed in the device 1405. In some examples, the transceiver 1410 may be operable to support communications via one or more communications links (e.g., a communication link 125, a backhaul communication link 120, a midhaul communication link 162, a fronthaul communication link 168).

The at least one memory 1425 may include RAM, ROM, or any combination thereof. The at least one memory 1425 may store computer-readable, computer-executable code 1430 including instructions that, when executed by one or more of the at least one processor 1435, cause the device 1405 to perform various functions described herein. The code 1430 may be stored in a non-transitory computer-readable medium such as system memory or another type of memory. In some cases, the code 1430 may not be directly executable by a processor of the at least one processor 1435 but may cause a computer (e.g., when compiled and executed) to perform functions described herein. In some cases, the at least one memory 1425 may contain, among other things, a BIOS which may control basic hardware or software operation such as the interaction with peripheral components or devices. In some examples, the at least one processor 1435 may include multiple processors and the at least one memory 1425 may include multiple memories. One or more of the multiple processors may be coupled with one or more of the multiple memories which may, individually or collectively, be configured to perform various functions herein (for example, as part of a processing system).

The at least one processor 1435 may include an intelligent hardware device (e.g., a general-purpose processor, a DSP, an ASIC, a CPU, a GPU, an FPGA, a microcontroller, a programmable logic device, discrete gate or transistor logic, a discrete hardware component, or any combination thereof). In some cases, the at least one processor 1435 may be configured to operate a memory array using a memory controller. In some other cases, a memory controller may be integrated into one or more of the at least one processor 1435. The at least one processor 1435 may be configured to execute computer-readable instructions stored in a memory (e.g., one or more of the at least one memory 1425) to cause the device 1405 to perform various functions (e.g., functions or tasks supporting selective beam sweeping to improve the range of wireless power transfer). For example, the device 1405 or a component of the device 1405 may include at least one processor 1435 and at least one memory 1425 coupled with one or more of the at least one processor 1435, the at least one processor 1435 and the at least one memory 1425 configured to perform various functions described herein. The at least one processor 1435 may be an example of a cloud-computing platform (e.g., one or more physical nodes and supporting software such as operating systems, virtual machines, or container instances) that may host the functions (e.g., by executing code 1430) to perform the functions of the device 1405. The at least one processor 1435 may be any one or more suitable processors capable of executing scripts or instructions of one or more software programs stored in the device 1405 (such as within one or more of the at least one memory 1425). In some implementations, the at least one processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the at least one processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the at least one memory 1425, the code 1430, and the at least one processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communication in accordance with examples as disclosed herein. For example, the communications manager 1420 is capable of, configured to, or operable to support a means for obtaining a beam sweeping sequence including a set of multiple beamforming parameters corresponding to a set of multiple beams associated with wireless power transmission to one or more EH UEs 115. The communications manager 1420 is capable of, configured to, or operable to support a means for transmitting a set of multiple beamformed power signals, where transmitting the set of multiple beamformed power signals includes cycling through the set of multiple beams in accordance with the beam sweeping sequence.

By including or configuring the communications manager 1420 in accordance with examples as described herein, the device 1405 may support techniques for efficient energy transfers using beam sweeping and selective transmission of beamformed power signals based on an estimated quantity of UEs in each beam direction, thereby facilitating efficient utilization of beamforming resources and time resources.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, one or more of the at least one processor 1435, one or more of the at least one memory 1425, the code 1430, or any combination thereof (for example, by a processing system including at least a portion of the at least one processor 1435, the at least one memory 1425, the code 1430, or any combination thereof). For example, the code 1430 may include instructions executable by one or more of the at least one processor 1435 (e.g., directly, indirectly, after pre-processing, without pre-processing) to cause the device 1405 to perform various aspects of selective beam sweeping to improve the range of wireless power transfer as described herein, or the at least one processor 1435 and the at least one memory 1425 may be otherwise configured to, individually or collectively, perform or support such operations.

FIG. 15 shows a flowchart illustrating a method 1500 that supports beam sweeping to improve the range of wireless power transfer in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving, from a network entity, an indication of a set of time resources associated with a beam sweeping transmission by the network entity and one or more frequency shifts associated with backscattering the beam sweeping transmission. The operations of block 1505 may be performed in accordance with examples as disclosed herein. In some examples, aspects of the operations of 1505 may be performed by a beam sweeping reception manager 925 as described with reference to FIG. 9.

At 1510, the method may include transmitting a backscattered signal based at least in part on the beam sweeping transmission and the one or more frequency shifts. The operations of block 1510 may be performed in accordance with examples as disclosed herein. In some examples, aspects of the operations of 1510 may be performed by a backscattered signal transmission manager 930 as described with reference to FIG. 9.

At 1515, the method may include receiving, from the network entity, a beamformed power signal in accordance with transmitting the backscattered signal. The operations of block 1515 may be performed in accordance with examples as disclosed herein. In some examples, aspects of the operations of 1515 may be performed by a beamformed power signal reception manager 935 as described with reference to FIG. 9.

At 1520, the method may include storing energy for powering the UE based at least in part on the beamformed power signal. The operations of block 1520 may be performed in accordance with examples as disclosed herein. In some examples, aspects of the operations of 1520 may be performed by an energy storage manager 940 as described with reference to FIG. 9.

FIG. 16 shows a flowchart illustrating a method 1600 that supports beam sweeping to improve the range of wireless power transfer in accordance with aspects of the present disclosure. The operations of the method 1600 may be implemented by a UE 115 or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving, from a network entity, an indication of a set of time resources associated with a beam sweeping transmission by the network entity and one or more frequency shifts associated with backscattering the beam sweeping transmission. The operations of block 1605 may be performed in accordance with examples as disclosed herein. In some examples, aspects of the operations of 1605 may be performed by a beam sweeping reception manager 925 as described with reference to FIG. 9.

At 1610, the method may include receiving an indication of a plurality of power levels associated with receiving the beam sweeping transmission, each of the plurality of power levels corresponding to a frequency shift of the one or more frequency shifts. The operations of block 1625 may be performed in accordance with examples as disclosed herein. In some examples, aspects of the operations of 1625 may be performed by a beam sweeping reception manager 945 as described with reference to FIG. 9.

At 1615, the method may include transmitting a backscattered signal based at least in part on the beam sweeping transmission and the one or more frequency shifts. The operations of block 1610 may be performed in accordance with examples as disclosed herein. In some examples, aspects of the operations of 1610 may be performed by a backscattered signal transmission manager 930 as described with reference to FIG. 9.

At 1620, the method may include receiving, from the network entity, a beamformed power signal in accordance with transmitting the backscattered signal. The operations of block 1615 may be performed in accordance with examples as disclosed herein. In some examples, aspects of the operations of 1615 may be performed by a beamformed power signal reception manager 935 as described with reference to FIG. 9.

At 1625, the method may include storing energy for powering the UE 115 based at least in part on the beamformed power signal. The operations of block 1620 may be performed in accordance with examples as disclosed herein. In some examples, aspects of the operations of 1620 may be performed by an energy storage manager 940 as described with reference to FIG. 9.

FIG. 17 shows a flowchart illustrating a method 1700 that supports beam sweeping to improve the range of wireless power transfer in accordance with aspects of the present disclosure. The operations of the method 1700 may be implemented by a network entity or its components as described herein. For example, the operations of the method 1700 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1705, the method may include obtaining a beam sweeping sequence including a plurality of beamforming parameters corresponding to a plurality of beams associated with wireless power transmission to one or more EH UEs 115. The operations of block 1705 may be performed in accordance with examples as disclosed herein. In some examples, aspects of the operations of 1705 may be performed by a beam sequence manager 1325 as described with reference to FIG. 13.

At 1710, the method may include transmitting a plurality of beamformed power signals, wherein transmitting the plurality of beamformed power signals comprises cycling through the plurality of beams in accordance with the beam sweeping sequence. The operations of block 1710 may be performed in accordance with examples as disclosed herein.

In some examples, aspects of the operations of 1710 may be performed by a beamformed power signal transmission manager 1330 as described with reference to FIG. 13.

FIG. 18 shows a flowchart illustrating a method 1800 that supports beam sweeping to improve the range of wireless power transfer in accordance with aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include obtaining a beam sweeping sequence including a plurality of beamforming parameters corresponding to a plurality of beams associated with wireless power transmission to one or more EH UEs 115. The operations of block 1805 may be performed in accordance with examples as disclosed herein. In some examples, aspects of the operations of 1805 may be performed by a beam sequence manager 1325 as described with reference to FIG. 13.

At 1810, the method may include transmitting a plurality of beamformed power signals, wherein transmitting the plurality of beamformed power signals comprises cycling through the plurality of beams in accordance with the beam sweeping sequence. The operations of block 1810 may be performed in accordance with examples as disclosed herein. In some examples, aspects of the operations of 1810 may be performed by a beamformed power signal transmission manager 1330 as described with reference to FIG. 13.

At 1815, the method may include receiving an indication of a quantity of the one or more EH UEs. The operations of block 1815 may be performed in accordance with examples as disclosed herein. In some examples, aspects of the operations of 1815 may be performed by an energy harvesting UE indication manager 1335 as described with reference to FIG. 13.

At 1820, the method may include transmitting the plurality of beamformed power signals based at least in part on the quantity of the one or more EH UEs 115. The operations of block 1820 may be performed in accordance with examples as disclosed herein. In some examples, aspects of the operations of 1820 may be performed by a beamformed power signal transmission manager 1330 as described with reference to FIG. 13.

The following provides an overview of aspects of the present disclosure:

Aspect 1: A method for wireless communication at a EH UE, comprising: receiving, from a network entity, an indication of a set of time resources associated with a beam sweeping transmission by the network entity and one or more frequency shifts associated with backscattering the beam sweeping transmission; transmitting a backscattered signal based at least in part on the beam sweeping transmission and the one or more frequency shifts; receiving, from the network entity, a beamformed power signal in accordance with transmitting the backscattered signal; and storing energy for powering the EH UE based at least in part on the beamformed power signal.

Aspect 2: The method of aspect 1, further comprising: measuring a stored energy at the EH UE, wherein transmitting the backscattered signal is based at least in part on the stored energy at the EH UE and a stored energy threshold.

Aspect 3: The method of any of aspects 1 through 2, further comprising: measuring a power level of the beamformed power signal, wherein transmitting the backscattered signal is based at least in part on a power level of the beamformed power signal and a beamformed power signal threshold.

Aspect 4: The method of any of aspects 1 through 3, wherein receiving the indication of the one or more frequency shifts comprises: receiving an indication of a plurality of power levels associated with receiving the beam sweeping transmission, each of the plurality of power levels corresponding to a frequency shift of the one or more frequency shifts.

Aspect 5: The method of aspect 4, wherein transmitting the backscattered signal is based at least in part on a power level of the plurality of power levels and a corresponding frequency shift of the one or more frequency shifts.

Aspect 6: The method of any of aspects 4 through 5, wherein each of the plurality of power levels is indicative of a relative distance from the network entity.

Aspect 7: The method of aspect 6, wherein receiving the beamformed power signal is based at least in part on a priority associated with the relative distance from the network entity.

Aspect 8: The method of any of aspects 4 through 7, wherein receiving, from the network entity, the beamformed power signal is based at least in part on a priority associated with each of the plurality of power levels, a first power level of the plurality of power levels is associated with a greater priority than a second power level of the plurality of power levels, the first power level being less than the second power level.

Aspect 9: The method of any of aspects 1 through 8, further comprising: receiving an indication of a plurality of power levels associated with the beam sweeping transmission, the beam sweeping transmission comprising a plurality of power-based beam sweeping transmissions, each of the plurality of power-based beam sweeping transmissions corresponding to a power level of the plurality of power levels and a backscattering sequence of a plurality of backscattering sequences for transmitting the backscattered signal; and transmitting the backscattered signal based at least in part on the backscattering sequence of the plurality of backscattering sequences.

Aspect 10: A method for wireless communication at a network entity, comprising: obtaining a beam sweeping sequence including a plurality of beamforming parameters corresponding to a plurality of beams associated with wireless power transmission to one or more EH UEs; and transmitting a plurality of beamformed power signals, wherein transmitting the plurality of beamformed power signals comprises cycling through the plurality of beams in accordance with the beam sweeping sequence.

Aspect 11: The method of aspect 10, wherein transmitting the plurality of beamformed power signals further comprises: receiving an indication of a quantity of the one or more EH UEs; and transmitting the plurality of beamformed power signals based at least in part on the quantity of the one or more EH UEs.

Aspect 12: The method of aspect 11, wherein receiving the indication of the quantity of the one or more EH UEs comprises: transmitting an indication of a set of time resources associated with a beam sweeping transmission and one or more frequency shifts associated with backscattering the beam sweeping transmission; and receiving one or more backscattered signals based at least in part on the beam sweeping transmission and the one or more frequency shifts, wherein the one or more backscattered signals comprise the indication of the quantity of the one or more EH UEs.

Aspect 13: The method of aspect 12, wherein receiving the one or more backscattered signals is based at least in part on a stored energy at the one or more EH UEs and a stored energy threshold.

Aspect 14: The method of any of aspects 12 through 13, wherein the beam sweeping sequence is associated with a plurality of beam directions of the plurality of beams over which the one or more backscattered signals are received.

Aspect 15: The method of any of aspects 12 through 14, wherein transmitting the indication of the set of time resources associated with the beam sweeping transmission comprises an indication of a plurality of power levels associated with transmitting the beam sweeping transmission, each of the plurality of power levels corresponding to a frequency shift of the one or more frequency shifts.

Aspect 16: The method of any of aspects 12 through 15, wherein transmitting the plurality of beamformed power signals is based at least in part on a priority associated with each of a plurality of power levels, each of the plurality of power levels associated with transmitting the beam sweeping transmission to the one or more EH UEs.

Aspect 17: The method of any of aspects 12 through 16, wherein receiving one or more backscattered signals is based at least in part on respective backscattering sequences associated with each of a plurality of power levels, each of the plurality of power levels associated with transmitting the beam sweeping transmission to the one or more EH UEs.

Aspect 18: An EH UE for wireless communication, comprising one or more memories storing processor-executable code, and one or more processors coupled with the one or more memories and individually or collectively operable to execute the code to cause the EH UE to perform a method of any of aspects 1 through 9.

Aspect 19: An EH UE for wireless communication, comprising at least one means for performing a method of any of aspects 1 through 9.

Aspect 20: A non-transitory computer-readable medium storing code for wireless communication, the code comprising instructions executable by a processor to perform a method of any of aspects 1 through 9.

Aspect 21: A network entity for wireless communication, comprising one or more memories storing processor-executable code, and one or more processors coupled with the one or more memories and individually or collectively operable to execute the code to cause the network entity to perform a method of any of aspects 10 through 17.

Aspect 22: A network entity for wireless communication, comprising at least one means for performing a method of any of aspects 10 through 17.

Aspect 23: A non-transitory computer-readable medium storing code for wireless communication, the code comprising instructions executable by a processor to perform a method of any of aspects 10 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., including a list of items prefaced by a phrase such as "at least one of" or "one or more of") indicates an inclusive list such that, for example, a list of at least one of A, B, or C means, e.g., A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" or "identify" or "identifying" encompasses a variety of actions and, therefore, "determining" or "identifying" can include calculating, computing, processing, deriving, investigating, looking up (such as via looking up in a table, a database or another data structure), ascertaining and the like. Also, "determining" or "identifying" can include receiving (such as receiving information or signaling, e.g., receiving information or signaling for determining, receiving information or signaling for identifying), accessing (such as accessing data in a memory, or accessing information) and the like. Also, "determining" or "identifying" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
at least one processor; and
at least one memory coupled with the at least one processor, the at least one memory storing instructions executable by the at least one processor to cause the UE to:
receive, from a network entity, an indication of a set of time resources associated with a beam sweeping transmission by the network entity and one or more frequency shifts associated with backscattering the beam sweeping transmission, wherein each of the one or more frequency shifts corresponds to a power level of a plurality of power levels associated with receiving the beam sweeping transmission;
transmit a backscattered signal based at least in part on the beam sweeping transmission and the one or more frequency shifts;
receive, from the network entity, a beamformed power signal in accordance with transmitting the backscattered signal; and store energy for powering the UE based at least in part on the beamformed power signal.

2. The UE of claim 1, wherein the instructions are further executable by the at least one processor to cause the UE to:
measure a stored energy at the UE, wherein transmitting the backscattered signal is based at least in part on the stored energy at the UE and a stored energy threshold.

3. The UE of claim 1, wherein the instructions are further executable by the at least one processor to cause the UE to:
measure a power level of the beamformed power signal, wherein transmitting the backscattered signal is based at least in part on the power level of the beamformed power signal and a beamformed power signal threshold.

4. The UE of claim 1, wherein the instructions to receive the indication of the one or more frequency shifts are further executable by the at least one processor to cause the UE to:
receive an indication of the plurality of power levels associated with receiving the beam sweeping transmission.

5. The UE of claim 4, wherein transmitting the backscattered signal is based at least in part on a first power level of the plurality of power levels and a corresponding frequency shift of the one or more frequency shifts.

6. The UE of claim 4, wherein each of the plurality of power levels is indicative of a relative distance from the network entity.

7. The UE of claim 6, wherein receiving the beamformed power signal is based at least in part on a priority associated with the relative distance from the network entity.

8. The UE of claim 4, wherein:
receiving, from the network entity,
the beamformed power signal is based at least in part on a priority associated with each of the plurality of power levels, and
a first power level of the plurality of power levels is associated with a greater priority than a second power level of the plurality of power levels, the first power level being less than the second power level.

9. The UE of claim 1, wherein the instructions are further executable by the at least one processor to cause the UE to:
receive an indication of the plurality of power levels associated with the beam sweeping transmission, the beam sweeping transmission comprising a plurality of power-based beam sweeping transmissions, each of the plurality of power-based beam sweeping transmissions corresponding to a power level of the plurality of power levels and a backscattering sequence of a plurality of backscattering sequences for transmitting the backscattered signal; and
transmit the backscattered signal based at least in part on the backscattering sequence of the plurality of backscattering sequences.

10. A network entity, comprising:
at least one processor; and
at least one memory coupled with the at least one processor, the at least one memory storing instructions executable by the at least one processor to cause the network entity to:
transmit an indication of a set of time resources associated with a beam sweeping transmission and one or more frequency shifts associated with backscattering the beam sweeping transmission by one or more energy harvesting user equipments (UEs), wherein each of the one or more frequency shifts corresponds to a power level of a plurality of power levels associated with the beam sweeping transmission;

obtain a beam sweeping sequence including a plurality of beamforming parameters corresponding to a plurality of beams associated with wireless power transmission to the one or more energy harvesting UEs; and
transmit a plurality of beamformed power signals, wherein transmitting the plurality of beamformed power signals comprises cycling through the plurality of beams in accordance with the beam sweeping sequence.

11. The network entity of claim 10, wherein the instructions to transmit the plurality of beamformed power signals are further executable by the at least one processor to cause the network entity to:
receive an indication of a quantity of the one or more energy harvesting UEs; and
transmit the plurality of beamformed power signals based at least in part on the quantity of the one or more energy harvesting UEs.

12. The network entity of claim 11, wherein the instructions to receive the indication of the quantity of the one or more energy harvesting UEs are further executable by the at least one processor to cause the network entity to:
receive one or more backscattered signals based at least in part on the beam sweeping transmission and the one or more frequency shifts, wherein the one or more backscattered signals comprise the indication of the quantity of the one or more energy harvesting UEs.

13. The network entity of claim 12, wherein receiving the one or more backscattered signals is based at least in part on a stored energy at the one or more energy harvesting UEs and a stored energy threshold.

14. The network entity of claim 12, wherein the beam sweeping sequence is associated with a plurality of beam directions of the plurality of beams over which the one or more backscattered signals are received.

15. The network entity of claim 12, wherein transmitting the indication of the set of time resources associated with the beam sweeping transmission comprises an indication of the plurality of power levels associated with transmitting the beam sweeping transmission.

16. The network entity of claim 12, wherein transmitting the plurality of beamformed power signals is based at least in part on a priority associated with each of the plurality of power levels, each of the plurality of power levels associated with transmitting the beam sweeping transmission to the one or more energy harvesting UEs.

17. The network entity of claim 12, wherein receiving the one or more backscattered signals is based at least in part on respective backscattering sequences associated with each of the plurality of power levels, each of the plurality of power levels associated with transmitting the beam sweeping transmission to the one or more energy harvesting UEs.

18. A method for wireless communication at a user equipment (UE), comprising:
receiving, from a network entity, an indication of a set of time resources associated with a beam sweeping transmission by the network entity and one or more frequency shifts associated with backscattering the beam sweeping transmission, wherein each of the one or more frequency shifts corresponds to a power level of a plurality of power levels associated with receiving the beam sweeping transmission;
transmitting a backscattered signal based at least in part on the beam sweeping transmission and the one or more frequency shifts;

receiving, from the network entity, a beamformed power signal in accordance with transmitting the backscattered signal; and storing energy for powering the UE based at least in part on the beamformed power signal.

19. The method of claim 18, further comprising:

measuring a stored energy at the UE, wherein transmitting the backscattered signal is based at least in part on the stored energy at the UE and a stored energy threshold.

20. The method of claim 18, further comprising:

measuring a power level of the beamformed power signal, wherein transmitting the backscattered signal is based at least in part on the power level of the beamformed power signal and a beamformed power signal threshold.

21. The method of claim 18, wherein receiving the indication of the one or more frequency shifts comprises:

receiving an indication of the plurality of power levels associated with receiving the beam sweeping transmission.

22. The method of claim 21, wherein transmitting the backscattered signal is based at least in part on a first power level of the plurality of power levels and a corresponding frequency shift of the one or more frequency shifts.

23. The method of claim 21, wherein each of the plurality of power levels is indicative of a relative distance from the network entity.

24. The method of claim 23, wherein receiving the beamformed power signal is based at least in part on a priority associated with the relative distance from the network entity.

25. The method of claim 21, wherein:

receiving, from the network entity, the beamformed power signal is based at least in part on a priority associated with each of the plurality of power levels, and a first power level of the plurality of power levels is associated with a greater priority than a second power level of the plurality of power levels, the first power level being less than the second power level.

26. The method of claim 18, further comprising:

receiving an indication of the plurality of power levels associated with the beam sweeping transmission, the beam sweeping transmission comprising a plurality of power-based beam sweeping transmissions, each of the plurality of power-based beam sweeping transmissions corresponding to a power level of the plurality of power levels and a backscattering sequence of a plurality of backscattering sequences for transmitting the backscattered signal; and transmitting the backscattered signal based at least in part on the backscattering sequence of the plurality of backscattering sequences.

27. A method for wireless communication at a network entity, comprising:

transmitting an indication of a set of time resources associated with a beam sweeping transmission and one or more frequency shifts associated with backscattering the beam sweeping transmission by one or more energy harvesting user equipments (UEs), wherein each of the one or more frequency shifts corresponds to a power level of a plurality of power levels associated with the beam sweeping transmission;

obtaining a beam sweeping sequence including a plurality of beamforming parameters corresponding to a plurality of beams associated with wireless power transmission to the one or more energy harvesting UEs; and transmitting a plurality of beamformed power signals, wherein transmitting the plurality of beamformed power signals comprises cycling through the plurality of beams in accordance with the beam sweeping sequence.

28. The method of claim 27, wherein transmitting the plurality of beamformed power signals further comprises:

receiving an indication of a quantity of the one or more energy harvesting UEs; and transmitting the plurality of beamformed power signals based at least in part on the quantity of the one or more energy harvesting UEs.

29. The method of claim 28, wherein receiving the indication of the quantity of the one or more energy harvesting UEs comprises:

receiving one or more backscattered signals based at least in part on the beam sweeping transmission and the one or more frequency shifts, wherein the one or more backscattered signals comprise the indication of the quantity of the one or more energy harvesting UEs.

30. The method of claim 29, wherein receiving the one or more backscattered signals is based at least in part on a stored energy at the one or more energy harvesting UEs and a stored energy threshold.

* * * * *